United States Patent
Jeon et al.

(10) Patent No.: US 11,861,129 B2
(45) Date of Patent: Jan. 2, 2024

(54) ELECTRONIC DEVICE

(71) Applicant: SAMSUNG DISPLAY CO., LTD., Yongin-si (KR)

(72) Inventors: Hyunjee Jeon, Hanam-si (KR); Sanghyun Lim, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/157,754

(22) Filed: Jan. 20, 2023

(65) Prior Publication Data

US 2023/0305665 A1 Sep. 28, 2023

(30) Foreign Application Priority Data

Mar. 23, 2022 (KR) .................. 10-2022-0035767

(51) Int. Cl.
*G06F 3/044* (2006.01)
*G06F 3/041* (2006.01)

(52) U.S. Cl.
CPC .......... *G06F 3/0446* (2019.05); *G06F 3/0416* (2013.01)

(58) Field of Classification Search
None
See application file for complete search history.

(56) References Cited

U.S. PATENT DOCUMENTS

| 9,693,391 | B2 | 6/2017 | Jang et al. |
| 2020/0285339 | A1 | 9/2020 | Kim et al. |
| 2021/0263630 | A1 | 8/2021 | Kim et al. |
| 2022/0236832 | A1* | 7/2022 | Watazu ............... G06F 3/0418 |

FOREIGN PATENT DOCUMENTS

| KR | 10-0649564 | 11/2006 |
| KR | 10-2021030 | 9/2019 |
| KR | 10-2020-0107019 | 9/2020 |
| KR | 10-2021-0106595 | 8/2021 |

* cited by examiner

*Primary Examiner* — Stephen T. Reed
(74) *Attorney, Agent, or Firm* — F. CHAU & ASSOCIATES, LLC

(57) ABSTRACT

An electronic device includes a display panel having a light emitting region and a non-light emitting region defined in the display panel, and including a light emitting device disposed in the light emitting region, an input sensor disposed on the display panel and including a first sensing electrode extending in a first direction and a second sensing electrode extending in a second direction crossing the first direction, and a heat generating module disposed on the input sensor. The heat generating module includes a heat generating electrode disposed in a layer the same as a layer for the first sensing electrode and the second sensing electrode, and a heat generating device disposed on the heat generating electrode and the second sensing electrode to electrically connect the heat generating electrode to the second sensing electrode.

23 Claims, 19 Drawing Sheets

ELECTRONIC DEVICE

CROSS-REFERENCE TO RELATED APPLICATIONS

This application claims priority under 35 U.S.C. § 119 from Korean Patent Application No. 10-2022-0035767, filed on Mar. 23, 2022 in the Korean Intellectual Property Office, the contents of which are herein incorporated by reference in their entirety.

TECHNICAL FIELD

Embodiments of the present disclosure described herein are directed to an electronic device, and more particularly, are directed to an electronic device that includes an input sensor and a heat generating module.

DISCUSSION OF THE RELATED ART

Various multimedia electronic devices, such as televisions (TV), cellular phones, tablet computers, navigation systems, or game consoles, have been developed. These electronic devices include a display panel, and use a keyboard and/or a mouse as an input device. Recently, the electronic devices include a touch panel that serves as the input device that senses a touch of a user and/or a touch of a pen.

SUMMARY

Embodiments of the present disclosure provide art electronic device that includes a heat generating module for an input sensor to increase folding reliability at a lower temperature.

According to an embodiment, an electronic device includes a display panel that includes a light emitting region, a non-light emitting region, and a light emitting device disposed in the light emitting region, an input sensor disposed on the display panel and that includes a first sensing electrode that extends in a first direction and a second sensing electrode that extends in a second direction that crosses the first direction, and a heat generating module disposed on the input sensor. The heat generating module includes a heat generating electrode disposed in a same layer the same as the first sensing electrode and the second sensing electrode, and a heat generating device disposed on the heat generating electrode and the second sensing electrode that electrically connects the heat generating electrode to the second sensing electrode.

The heat generating device may include a conductor that generates heat in proportion to a resistance.

The electronic device further includes a sensor driver connected to the input sensor. The first sensing electrode is a receive electrode that transmits a sensing voltage to a sensor driver, and the second sensing electrode is a transmit electrode that receives a driving voltage from the sensor driver.

The heat generating module is driven based on the driving voltage such that the heat generating device generates heat.

The first sensing electrode, the second sensing electrode, and the heat generating electrode have a mesh shape that includes a mesh pattern that overlaps the non-light emitting region.

The heat generating device includes a plurality of heat generating devices, and the plurality of heat generating devices overlap the mesh pattern.

The electronic device further includes a light blocking pattern disposed on the mesh pattern and that overlaps the non-light emitting region. The light blocking pattern covers the plurality of heat generating devices.

The second sensing electrode includes a first part and a second part that are spaced apart from each other. The heat generating electrode is interposed between the first part and the second part.

The heat generating device includes a first heat generating device that connects the first part to the heat generating electrode and a second heat generating device that connects the second part with the heat generating electrode.

The heat generating module further includes a switch connected to the heat generating electrode, and the switch controls a driving of the heat generating device.

The electronic device further includes a thin film encapsulating layer disposed on the display panel, and the input sensor is directly disposed on the thin film encapsulating layer.

The input sensor includes a first insulating layer disposed on the thin film encapsulating layer and a second insulating layer disposed on the first insulating layer. The first sensing electrode, the second sensing electrode, and the heat generating electrode are disposed on the first insulating layer.

The heat generating device is disposed on the second insulating layer. The second insulating layer has an opening that exposes the second sensing electrode and the heat generating electrode. The heat generating device is electrically connected to the second sensing electrode and the heat generating electrode through the opening.

The heat generating device includes a light blocking material that blocks light from being transmitted or reflected.

A first voltage is applied to the second sensing electrode, and a second voltage that is phase reverses with respect to a phase of the first voltage is applied to the heat generating electrode.

The heat generating electrode includes a temperature sensor. The first sensing electrode includes a first part adjacent to the temperature sensor and a second part connected to the first part and that is not adjacent to the temperature sensor.

The electronic device further includes s temperature sensor disposed in the same layer as the input sensor. The input sensor may include a plurality of sensor units, in which each sensor unit includes the first sensing electrode and the second sensing electrode. The temperature sensor measures the temperature of each of the plurality of sensor units.

The temperature sensor extends in the first direction. Each of the plurality of second sensing electrodes disposed in the plurality of sensor units respectively includes a first part adjacent to the temperature sensor and a second part connected to the first part and that is not adjacent to the temperature sensor.

The heat generating device includes a plurality of heat generating devices. The plurality of heat generating devices are provided in the plurality of sensor units, respectively. The plurality of heat generating devices connect the heat generating electrode to the second part.

The temperature sensor senses a temperature of each sensor unit through the first part of the second sensing electrodes. The heat generating module selectively drives heat generating devices disposed in some sensor units of the plurality of sensor units based on the temperature of each sensor unit.

The heat generating module controls a heat emission operation of the heat generating device, based on a driving frequency applied to the input sensor.

According to an embodiment, an electronic device includes an input sensor that includes a plurality of sensor units, wherein each sensor unit includes a plurality of first sensing electrodes that extend in a first direction and a plurality of second sensing electrodes that extend in a second direction that crosses the first direction, a heat generating module disposed on the input sensor, and a temperature sensor disposed in a same layer as the input sensor and that measures a temperature of each of the plurality of sensor units. The heat generating module includes a heat generating electrode disposed in a same layer as the first sensing electrodes and the second sensing electrodes, and a plurality of heat generating devices disposed on the heat generating electrode and the second sensing electrodes that electrically connect the heat generating electrode to the second sensing electrodes. The heat generating module selectively drives heat generating devices disposed in some sensor units of the plurality of sensor units based on the temperature of each sensor unit.

The electronic device further includes a display panel that includes a light emitting region, a non-light emitting region, and a light emitting device disposed in the light emitting region. The input sensor is disposed on the display panel.

DETAILED DESCRIPTION

Figure 1A:
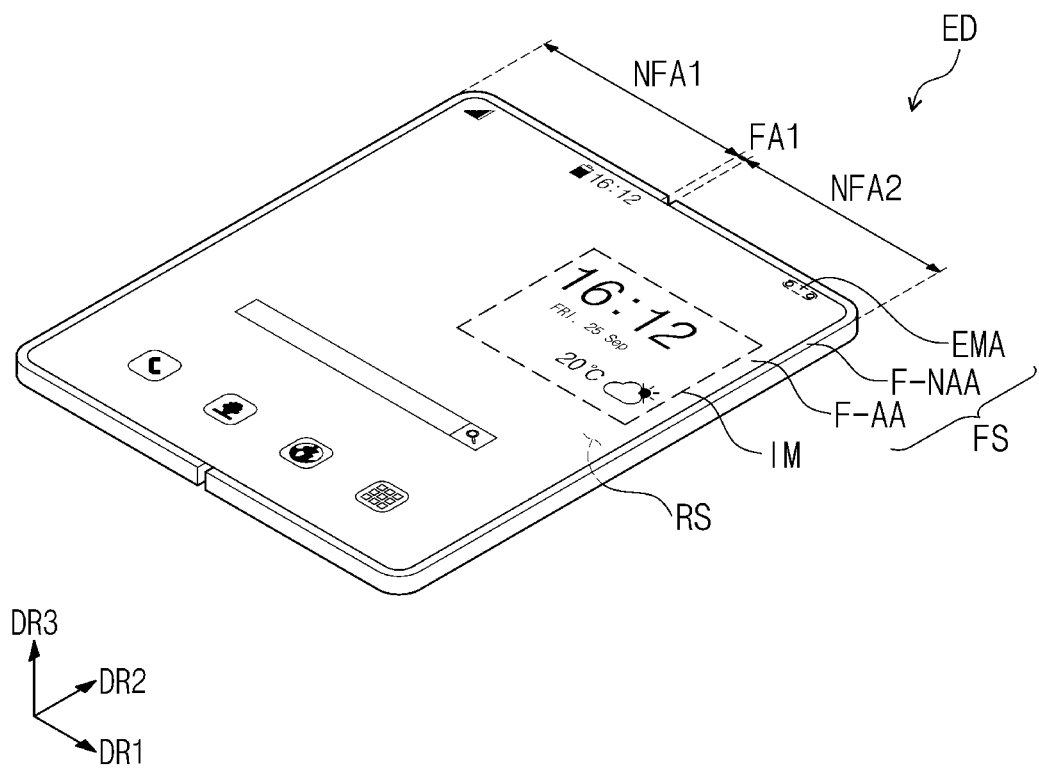
FIGS. 1A to 1E are perspective views of an electronic device, according to art embodiment.

In the specification, the expression that a first component (or region, layer, part, portion, etc.) is "on", "connected with", or "coupled with" a second component means that the first component may be directly on, connected with, or coupled with the second component or means that a third component may be interposed therebetween.

The same reference numeral may refer to the same component. In addition, in drawings, thicknesses, proportions, and dimensions of components may be exaggerated to describe the technical features effectively. The expression "and/or" includes one or more combinations which associated components are capable of defining.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

In addition, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described m the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to the accompanying drawings.

Figure 1B:
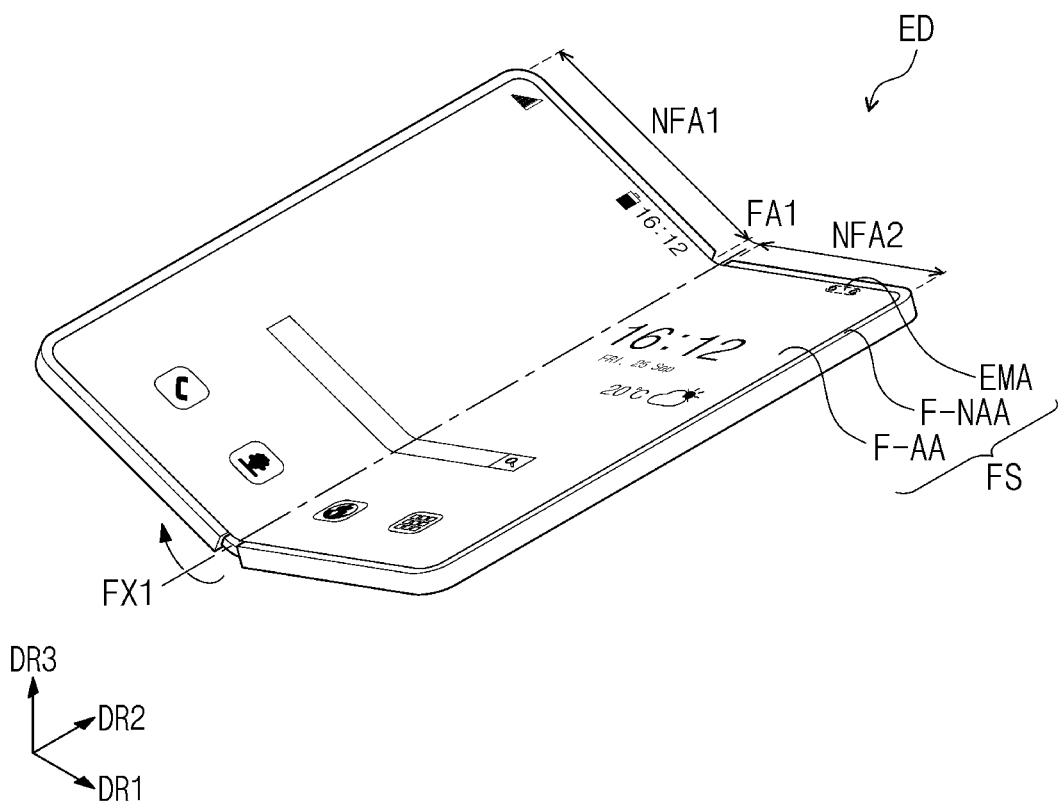
Figure 1C:
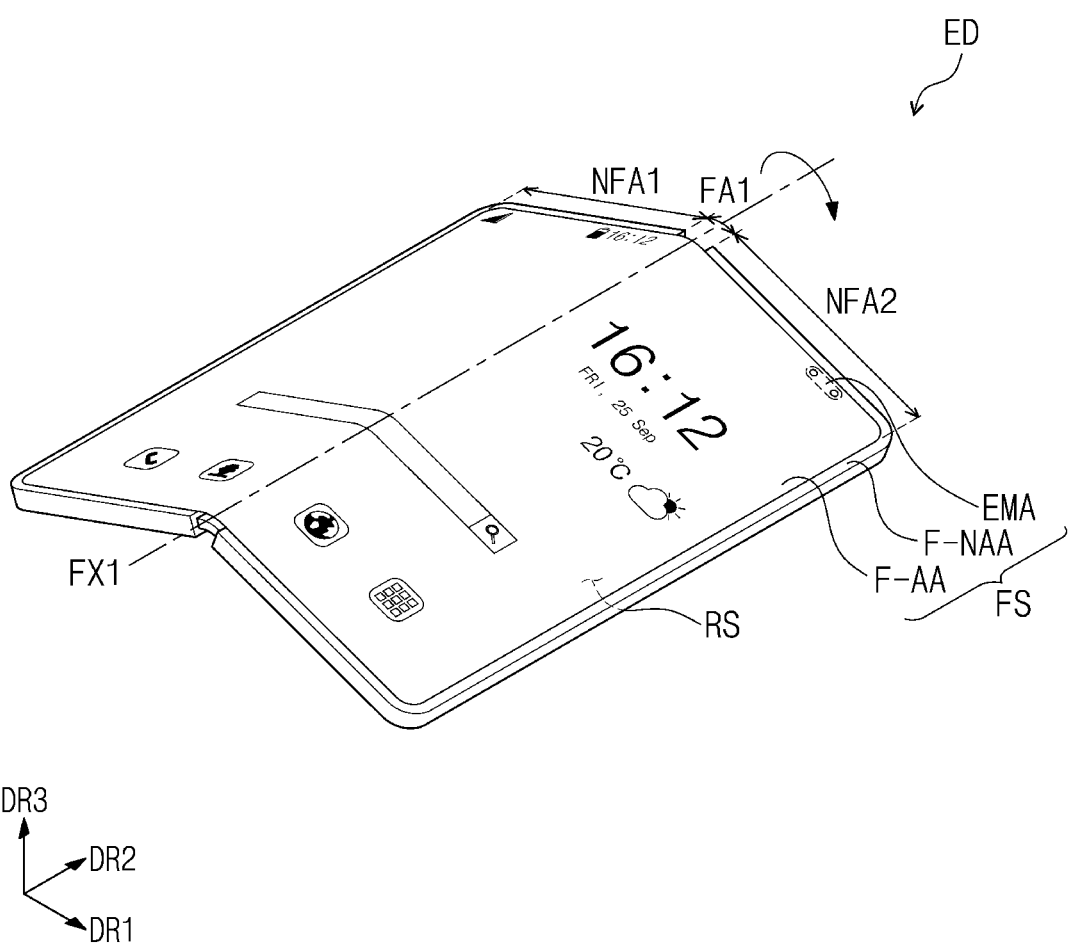

FIG. 1A is a perspective view of an electronic device unfolded, according to an embodiment. FIG. 1B is a perspective view of an electronic device of FIG. 1A, which is being in-folded. FIG. 1C is a perspective view of an electronic device of FIG. 1A, which is being out-folded.

According to an embodiment, an electronic device ED is activated in response to an electrical signal. For example, the electronic device ED is one of a cellular phone, a tablet, a vehicle navigation system, a game console, or a wearable device, but embodiments of the present disclosure are not necessarily limited thereto. For example, FIG. 1A shows that the electronic device ED is a cellular phone.

Referring to FIGS. 1A to 1C, the electronic device ED according to an embodiment includes a first display surface FS that is parallel to a plane defined by a first directional axis DR1 and a second directional axis DR2 that crosses the first directional axis DR1. The electronic device ED provides an image IM to the user through the first display surface FS. The electronic device ED displays the image IM on the first display surface FS such that the image IM is projected along a third directional axis DR3 that is normal; to the plane defined by the first and second directional axes DR1 and DR2. In the present specification, a front surface (or a top surface) and a rear surface (or a bottom surface) of each component are defined based on a direction in which the image IM is displayed. The front surface and the rear surface may be opposite to each other on the third direction axis DR3, and the normal direction of each of the front surface and the rear surface is parallel to the third direction axis DR3.

The electronic device ED according to an embodiment may include the first display surface FS and a second display surface RS. The first display surface FS may include a first active region F-AA and a first peripheral region F-NAA. The first active region F-AA may include an electronic module region EMA. The second display surface RS may be located on a surface opposite to at least a portion of the first display surface FS. For example, the second display surface RS may be located on a portion of a rear surface of the electronic device ED.

The electronic device ED according to an embodiment can detect an externally applied input. The external input includes various types of inputs received from the outside of the electronic device ED. For example, as well as a contact by a body part, such as a user's hand, etc., the external input includes an external input, such as a hovering input, that is sensed when a user's hand approaches the electronic device ED or is adjacent to the electronic device ED within a given distance. In addition, the external input includes force, pressure, temperature, or light.

FIG. 1A and drawings thereafter illustrate the first to third directional axes DR1 to DR3, however, directions indicated by the first to third directional axes DR1 to DR3 described in this specification are relative concepts and can be transformed into other directions The first active region F-AA of the electronic device ED is activated in response to an electrical signal. The electronic device ED may display the image IM through the first active region F-AA. In addition, various types of external inputs can be detected in the first active region F-AA. The first peripheral region F-NAA is adjacent to the first active region F-AA. The first peripheral region F-NAA may have a specific color. The first peripheral region F-NAA surrounds the first active region F-AA. Accordingly, the shape of the first active region F-AA is substantially defined by the first peripheral region F-NAA. However, embodiments are not necessarily limited thereto, and in some embodiments, the first peripheral region F-NAA is disposed to be adjacent to only one side of the first active region F-AA or is omitted. The active region of the electronic device ED according to an embodiment of the present disclosure may have one of various other shapes, and the present disclosure is not necessarily limited to any one embodiment.

The electronic device ED may include a folding region FA1 and non-folding regions NFA1 and NFA2. The electronic device ED may include the plurality of non-folding regions NFA1 and NFA2. According to an embodiment, the non-folding regions NFA1 and NFA2 are adjacent to the folding region FA1 while the folding region FA1 is interposed between the non-folding regions NFA1 and NFA2. The electronic device ED may include a first non-folding region NFA1 and a second non-folding region NFA2 that are spaced apart from each other in the first directional axis DR1 while the folding region FA1 is interposed between the first non-folding region NFA1 and the second non-folding region NFA2. For example, the first non-folding region NFA1 may be disposed at one side of the folding region FA1 in the first direction DR1, and the second non-folding region NFA2 may be disposed at an opposite side of the folding region FA1 in the first direction DR1.

Note that although FIGS. 1A to 1C show that the electronic device ED includes one folding region FA1 according to an embodiment, embodiments are not necessarily limited thereto. For example, in an embodiment, the electronic device ED includes a plurality of folding regions.

Referring to FIG. 1B, the electronic device ED according to an embodiment may be folded about a first folding axis FX1. The first folding axis FX1 is a virtual axis that extends in parallel to the second directional axis DR2 on the first display surface FS, and the first folding axis FX1 may be parallel to a longer side of the electronic device ED.

The electronic device ED can be folded about the first folding axis FX1 and may change into an in-folded state in which one region of the first display surface FS that overlaps the first non-folding region NFA1 faces another region that overlaps the second non-folding region NFA2.

When the electronic device ED according to an embodiment is in-folded, the second display surface RS may be viewable by the user. The second display surface RS may further includes an electronic module region for an electronic module that includes various components, and embodiment of the present disclosure are not necessarily limited to any ono embodiment.

Referring to FIG. 1C, the electronic device ED according to an embodiment can be folded about the first folding axis FX1 and may change into an out-folded state in which one region of the second display surface RS that is overlaps the first non-folding region NFA1 faces and another region of the second display surface RS that overlaps the second non-folding region NFA2.

However, embodiments are not necessarily limited thereto. For example, in an embodiment, the electronic device ED is folded about a plurality of folding axes, such that portions of the first display surface FS face each other, portions of the second display surfaces RS face each other, and the number of the folding axes and the number of the non-folding regions are not necessarily limited thereto.

Various electronic modules can be disposed in the electronic module region EMA. For example, the electronic module may be at least one of a camera, a speaker, a light sensing sensor, or a heat sensing sensor. The electronic module region EMA may sense an external subject through the first or second display surfaces FS or RS or may output a sound signal, such as a voice, through the first or second display surfaces FS or RS. The electronic module may include a plurality of components, and embodiments of the present disclosure are not necessarily limited to any one embodiment.

The electronic module region EMA may be surrounded by the first active region F-AA and the first peripheral region F-NAA. However, embodiments of the present disclosure are not necessarily limited thereto. For example, in an embodiment, the electronic module region EMA is disposed inside the first active region F-AA.

Figure 1D:
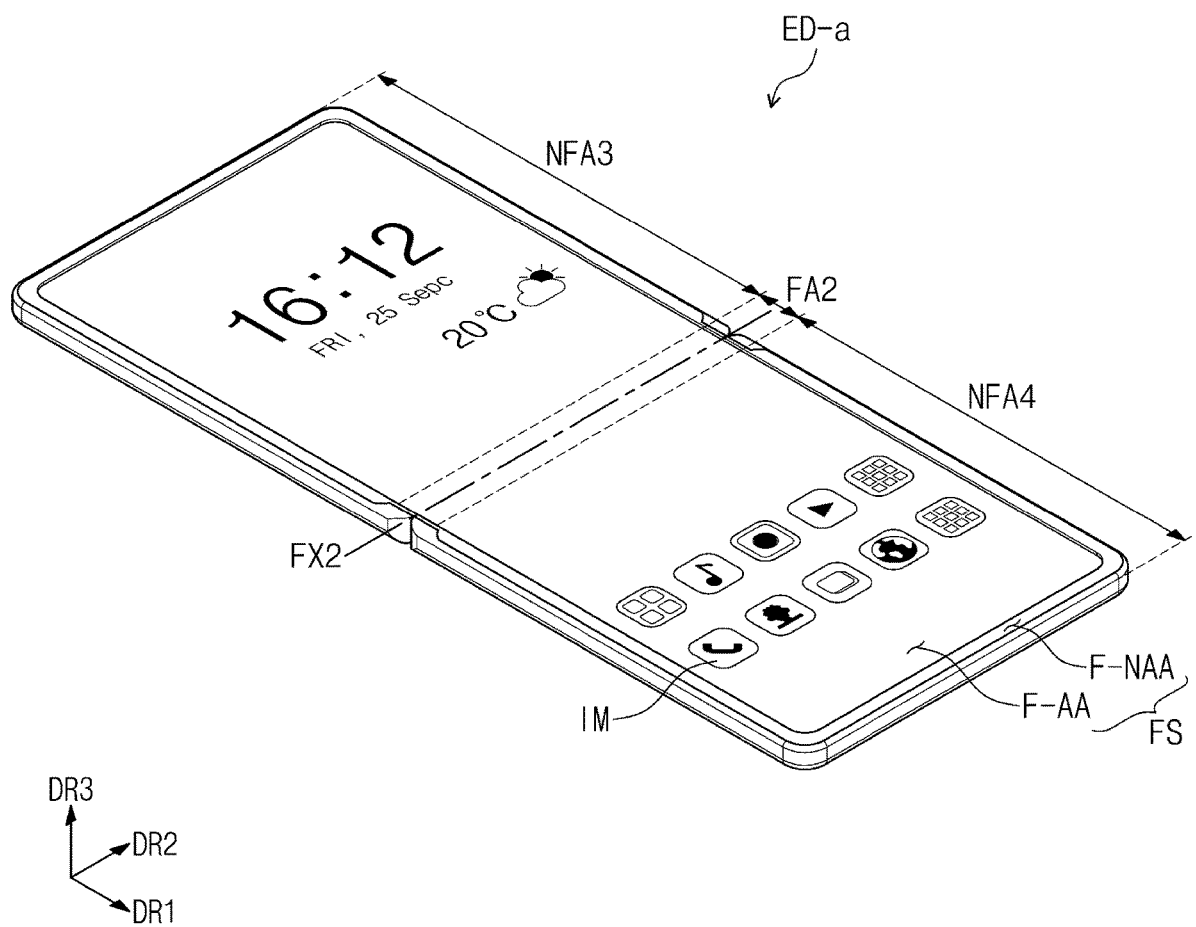
Figure 1E:
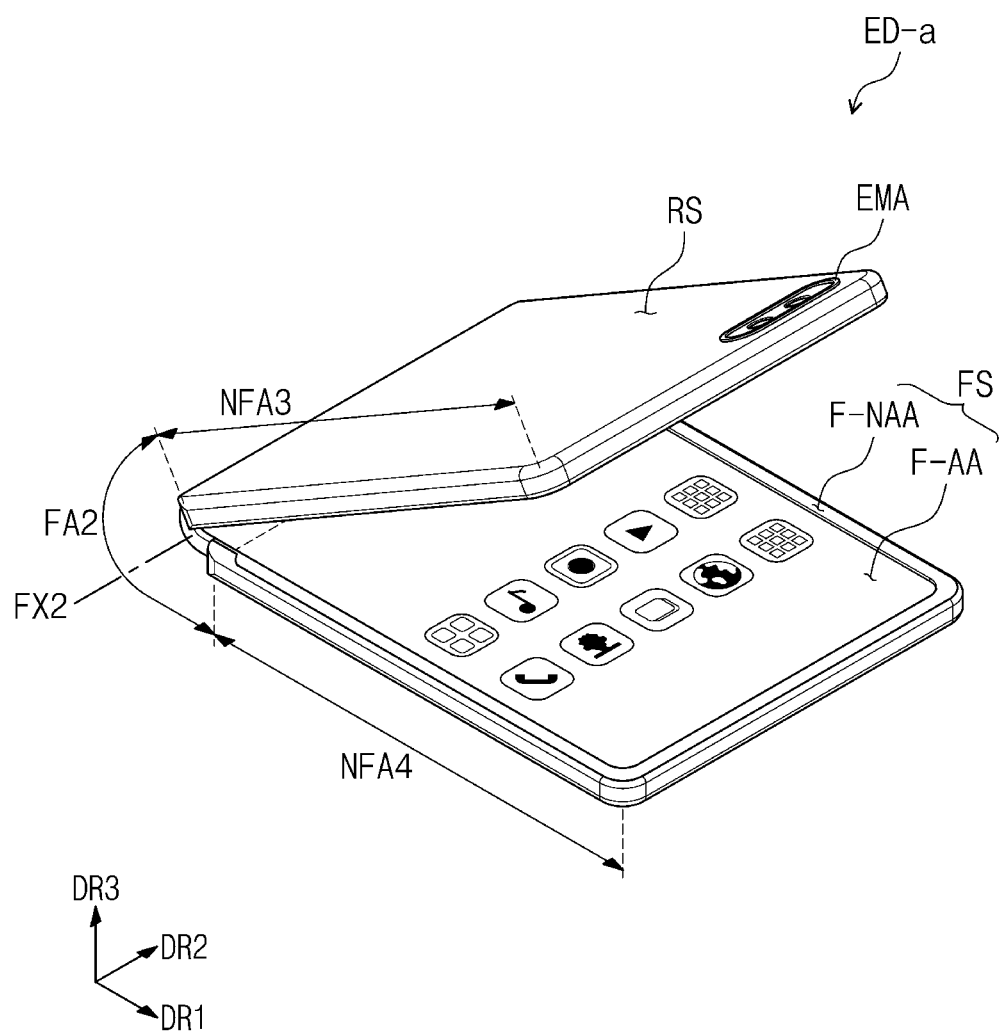

FIG. 1D is a perspective view of an unfolded electronic device, according to an embodiment. FIG. 1E is a perspective view of an electronic device of FIG. 1D that is being an in-folded.

According to an embodiment, an electronic device ED-a may be folded about a second folding axis FX2 that extends in a direction parallel to the second direction DR2. FIGS. 1D and 1E show that the extension direction of the second folding axis FX2 is parallel to a shorter side of the electronic device ED-a. However, embodiments are not necessarily limited thereto.

According to an embodiment, the electronic device ED-a may include at least one folding region FA2 and non-folding regions NFA3 and NFA4 adjacent to the folding region FA2. The non-folding regions NFA3 and NFA4 may be spaced apart from each other while the folding region FA2 is interposed between the non-folding regions NFA3 and NFA4.

The folding region FA2 has a specific curvature and a specific radius of curvature. According to an embodiment, the first non-folding region NFA3 and the second non-folding region NFA4 may face each other, and the electronic device ED-a can be in-folded, such that the display surface FS is not externally exposed.

In addition, according to an embodiment, the electronic device ED-a can be out-folded, such that the display surface FS is externally exposed. According to an embodiment, when the electronic device ED-a is unfolded, the first display surface FS can be viewed by a user. When the electronic device ED-a is in-folded, the second display surface RS can be viewed by the user. The second display surface RS may include the electronic module region EMA for the electronic module.

According to an embodiment, the electronic device ED-a include the second display surface RS, and the second display surface RS is located opposite to at least a portion of the first display surface FS. In the in-folding state, the second display surface RS can be viewed by a user. The second display surface RS may include the electronic module region EMA for the electronic module. According to an embodiment, an image can be provided through the second display surface RS.

According to an embodiment, the electronic devices ED and ED-a can be subject to repeated sequences of being unfolded and infolded, or of repeated sequences of being unfolded and outfolded, but embodiments are not necessarily limited thereto. According to an embodiment, the electronic devices ED and ED-a can select any one of an unfolding operation, an in-folding operation, or an out-folding operation.

Figure 2:
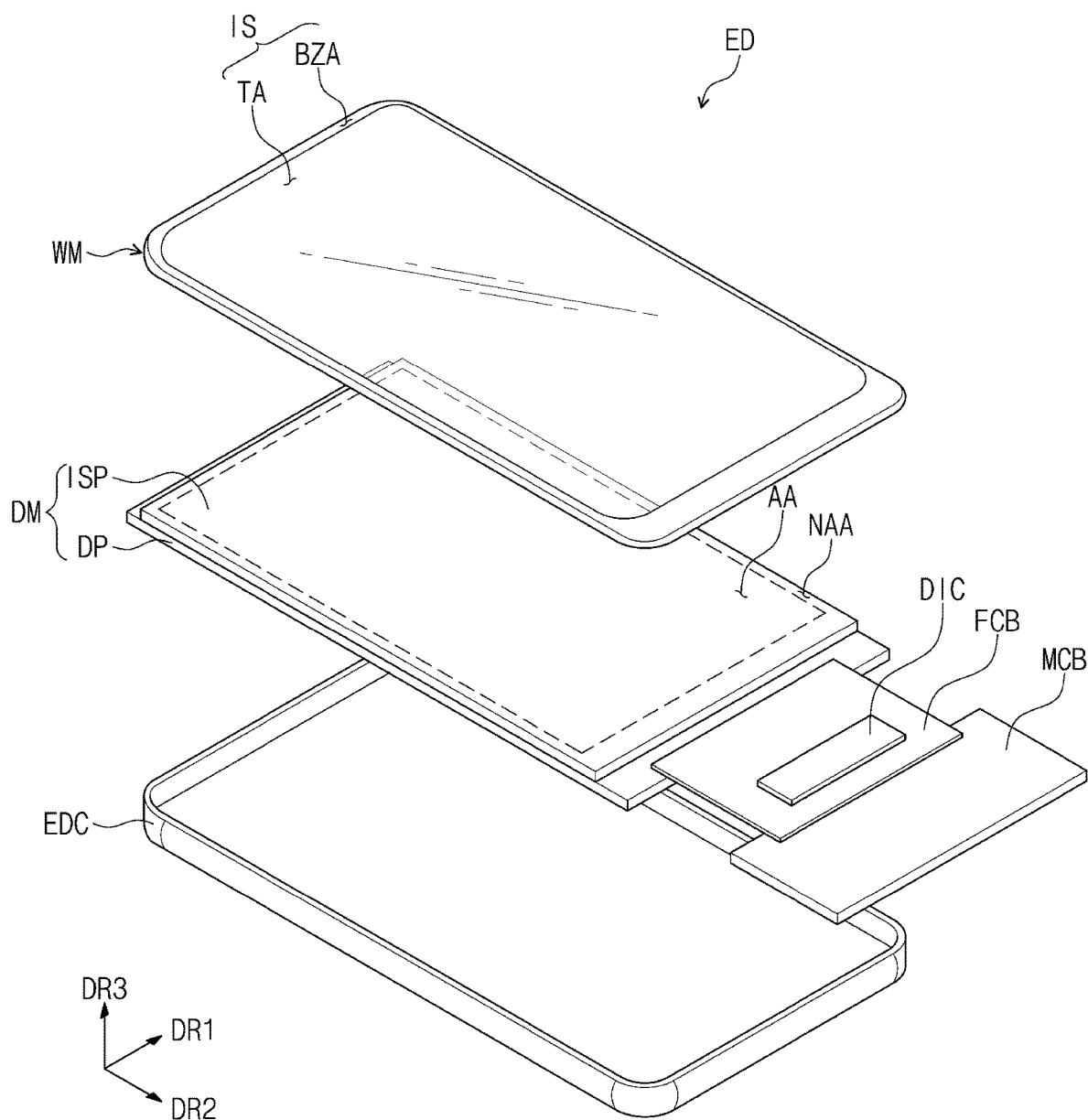
FIG. 2 is an exploded perspective view of an electronic device, according to an embodiment.

FIG. 2 is an exploded perspective view of an electronic device, according to an embodiment.

Referring to FIG. 2, in an embodiment, the electronic device ED include a window WM, a display module DM, and an external case EDC. The window WM is divided into a transmission region TA and a bezel region BZA. The transmission region TA is where the image IM is displayed. A user can see the image IM through the transmission region TA. In an embodiment, the transmission region TA has a rectangular shape with rounded vertexes. However, embodiments are not necessarily limited thereto, and in other embodiments, the transmission region TA may have different shapes.

The bezel region BZA is adjacent to the transmission region TA. The bezel region BZA may have a specific color. The bezel region BZA may surround the transmission region TA. Accordingly, the shape of the transmission region TA may be substantially defined by the bezel region BZA. However, embodiments are not necessarily limited thereto, and in some embodiments, the bezel region BZA may be adjacent to only one side of the transmission region TA or may be omitted.

The display module DM includes a display panel DP and an input sensor ISP.

According to an embodiment of the present disclosure, the display panel DP may be an emissive-display panel. For example, the display panel DP may be one of an organic light emitting display panel, an inorganic light emitting display panel, or a quantum dot light emitting display panel. A light emitting layer of a organic light emitting display panel includes an organic light emitting material. A light emitting layer of an inorganic light emitting display panel includes an inorganic light emitting material. A light emitting layer of a quantum dot light emitting display panel includes a quantum dot and a quantum rod. The following described an embodiment in which the display panel DP includes an organic light emitting display panel.

The display panel DP may output the image IM, and the output image may be displayed on a display surface IS of the display panel. The input sensor ISP may be disposed on the display panel DP and senses an external input. The window WM includes a transparent material through which the image IM is output. For example, the window WM includes at least one of glass, sapphire, or plastic. Although the window WM is illustrated as having a single layer, embodiments of the present disclosure are not necessarily limited thereto. For example, in an embodiment, the window WM includes a plurality of layers.

In addition, the non-display region BZA of the electronic device ED described above may correspond to a region of the window WM in which a material that includes a specific color is printed. For example, according to an embodiment of the present disclosure, the window WM may include a light blocking pattern in the bezel region BZA. The light blocking pattern, which is a colored organic film, may be, for example, formed by coating.

The window WM is coupled to the display module DM through an adhesive film. According to an embodiment of the present disclosure, the adhesive film includes an optically dear adhesive film (OCA). However, the adhesive film is not necessarily limited thereto, and in other embodiments, includes a typical adhesive agent and adhesion agent. For example, in an embodiment, the adhesive film includes an optically clear resin (OCR) or a pressure sensitive adhesive (PSA) film.

An anti-reflective layer may be further interposed between the window WM and the display module DM. The anti-reflective layer reduces a reflective index of external light incident from an upper portion of the window WM. According to an embodiment of the present disclosure, the anti-reflective layer may include a phase retarder and a polarizer. The retarder may have one of a film type or a liquid crystal coating type, and may include a $\lambda/2$ retarder and/or a $\lambda/4$ retarder. The polarizer may also have one of a film type or a liquid crystal coating type. The film type polarizer may include a stretched synthetic resin film, and the liquid crystal coating type polarizer may include liquid crystals that are aligned in a predetermined array. The retarder and the polarizer can be implemented with one polarization film.

The display module DM displays an image in response to an electrical signal, and can transmit or receive information on an external input. The display module DM includes an active region AA and a peripheral region NAA. The active region AA is a region through which an image is output from the display module DM. In addition, the active region AA is where the input sensor ISP can sense an externally applied input.

The peripheral region NAA is adjacent to the active region AA. For example, the peripheral region NAA surrounds the active region AA. However, embodiments are not necessarily limited thereto. For example, in other embodiments, the peripheral region NAA has various other forms. According to an embodiment, the active region AA of the display module DM corresponds to at least a portion of the transmission region TA.

The display module DM further may include a main circuit board MCB, a flexible circuit film FCB, and a driver chip DIC. The main circuit board MCB may be connected with the flexible circuit film FCB and electrically connected with the display panel DP. The flexible circuit film FCB is connected with the display panel DP and electrically connects the display panel DP with the main circuit board MCB.

The main circuit board MCB may include a plurality of driving devices. The plurality of driving devices may include a circuit part that drives the display panel DP. The driver chip DIC is mounted on the flexible circuit film FCB. According to an embodiment of the present disclosure, although one flexible circuit film FCB is illustrated, embodiments of the present disclosure are not necessarily limited thereto. For example, in an embodiment, a plurality of flexible circuit films FCBs are provided and connected with the display panel DP. Although FIG. 2 shows that the driver chip DIC is mounted on the flexible circuit film FCB, embodiments of the present disclosure are not necessarily limited thereto. For example, in an embodiment, the driver chip DIC is directly mounted on the display panel DP. For example, in an embodiment, a part of the display panel DP on which the driver chip DIC is mounted is bent and disposed on a rear surface of the display module DM. In addition, in an embodiment, the driver chip DIC is directly mounted on the main circuit board MCB.

The input sensor ISP is electrically connected with the main circuit board MCB through the flexible circuit film FCB. However, embodiments of the present disclosure are not necessarily limited thereto. In other embodiments, the display module DM additionally includes a separate flexible circuit film that electrically connects the input sensor ISP to the main circuit board MCB.

The electronic device ED further includes the external case EDC that receives the display module DM. The external case EDC is coupled to the window WM and defines an outer appearance of the electronic device ED. The external case EDC absorbs externally applied impacts and prevents foreign substances/moisture from permeating into the display module DM and protects components received in the external case EDC. However, according to an embodiment of the present disclosure, the external case EDC may include a plurality of receiving members that are coupled to each other.

According to an embodiment, the electronic device ED further includes an electronic module that includes various functional modules that operate the display module DM, a power supply module that supplies power for operating the electronic device ED, the display module DM and/or a bracket coupled to the external case EDC that divides an internal space of the electronic device ED.

Figure 3:
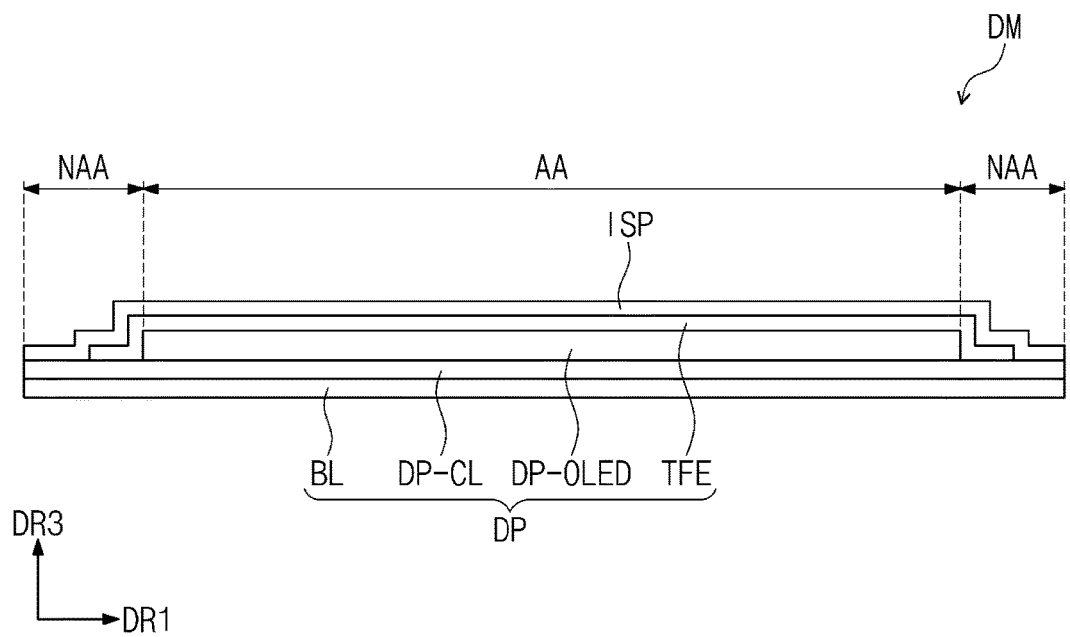
FIG. 3 is a cross-sectional view of a display module illustrated in FIG. 2.

FIG. 3 is a cross-sectional view of a display module illustrated in FIG. 2.

Referring to FIG. 3, in an embodiment, the display module DM includes the display panel DP and the input sensor ISP. The display panel DP includes a base layer BL, a circuit device layer DP-CL disposed on the base layer BL, a display device layer DP-OLED disposed on the circuit device layer DP-CL, and an encapsulating layer TFE disposed on the display device layer DP-OLED and the circuit device layer DP-CL. In addition, the display panel DP may further include functional layers, such as an anti-reflective layer or a reflective index adjusting layer.

The base layer BL includes at least one plastic film. The base layer BL is one of a plastic substrate, a glass substrate, a metal substrate, or an organic/inorganic composite substrate. According to an embodiment of the present disclosure, the base layer BL may include a flexible substrate. The active region AA and the peripheral region NAA described with reference to FIG. 2 are defined in the base layer BL.

The circuit device layer DP-CL includes at least one intermediate insulating layer and a circuit device. The intermediate insulating layer includes at least one intermediate inorganic layer and at least one intermediate organic layer. The circuit device includes signal lines, and a driving circuit for pixels.

The display device layer DP-OLED includes a light emitting device. The light emitting device includes at least one organic light emitting diode. The display device layer DP-OLED further includes an organic film such as a pixel defining film. The display device layer DP-OLED may be disposed on the circuit device layer DP-CL in the active region, but not in the peripheral region NAA.

The encapsulating layer TFE encapsulates the display device layer DP-OLED. The encapsulating layer TFE may be disposed on the circuit device layer DP-CL in the peripheral region NAA. The encapsulating layer TFE includes at least one inorganic layer. The encapsulating layer TFE further includes at least one organic layer. The inorganic layer protects the display device layer DP-OLED from moisture/oxygen and the organic layer protects the display device layer DP-OLED from the foreign substances, such as dust particles. The inorganic layer include at least one of a silicon nitride layer, a silicon oxynitride layer, a silicon oxide layer, a titanium oxide layer, or an aluminum oxide layer. The organic layer includes, but is not necessarily limited to, an acrylic-based organic layer.

The input sensor ISP is formed on the display panel DP through a subsequent process. In addition, the input sensor ISP and the display panel DP are coupled to each other through an adhesive film. The input sensor ISP has a multi-layer structure. The input sensor ISP may include a single-layer insulating layer or a multi-layer insulating layer. According to an embodiment of the present disclosure, when the input sensor ISP is directly disposed on the display panel DP, the input sensor ISP is directly disposed on the encapsulating layer TFE, and no adhesive film is interposed between the input sensor ISP and the display panel DP. However, according to an embodiment, the adhesive film is interposed between the input sensor ISP and the display panel DP. For example, the input sensor ISP is not fabricated together with the display panel OP. For example, after fabricating the input sensor ISP through a process separate from that of the display panel DP, the input sensor ISP is fixed on a top surface of the display panel DP through the adhesive film.

However, according to an embodiment of the present disclosure, the display panel DP may further include the encapsulating layer TFE. The encapsulating layer TFE may be disposed on the display device layer DP-OLED and faces the base layer BL. The encapsulating layer TFE includes at least one of a plastic substrate, a glass substrate, a metal substrate, or an organic/inorganic composite substrate. A sealant is interposed between the encapsulating layer TFE and the base layer BL, and the encapsulating layer TFE and the base layer BL may be coupled to each other by the sealant. The sealant includes an organic adhesive or a frit, which is a ceramic adhesive material. The display device layer DP-OLED may be sealed by the sealant and the encapsulating layer TFE.

When the input sensor ISP is directly disposed on the display panel DP, the input sensor ISP is directly disposed on the encapsulating layer TFE. However, according to an embodiment, when the adhesive film is interposed between the input sensor ISP and the display panel DP, the input sensor ISP is fixed to the top surface of the encapsulating layer TFE through the adhesive film.

Figure 4:
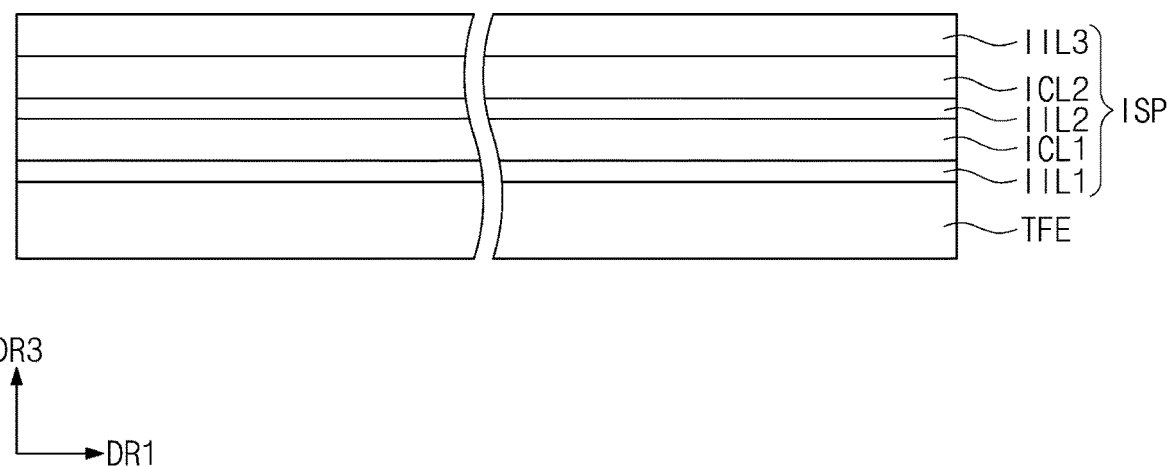
FIG. 4 is a cross-sectional view of an input sensor, according to an embodiment of the present disclosure.

FIG. 4 is a cross-sectional view of an input sensor, according to an embodiment of the present disclosure;

Referring to FIG. 4, the input sensor ISP according to an embodiment of the present disclosure may include a first sensing insulating layer IIL1, a first conductive layer ICL1, a second sensing insulating layer IIL2, a second conductive layer ICL2, and a third sensing insulating layer IIL3. The first sensing insulating layer IIL1 may be directly disposed on the encapsulating layer TFE. However, according to an embodiment of the present disclosure, the first sensing insulating layer IIL1 may be omitted.

Each of the first conductive layer ICL1 and the second conductive layer ICL2 includes a plurality of conductive patterns. The conductive patterns may include a plurality of sensing electrodes SE1_1 to SE1_5 and SE2_1 to SE2_4 (see FIG. 5) and a plurality of signal lines SL1_1 to SL1_5 and SL2_1 to SL2_4 (see FIG. 5) that are respectively connected to the plurality of sensing electrodes SE1_1 to SE1_5 and SE2_1 to SE2_4.

Each of the first to third sensing insulating layers IIL1 to IIL3 includes at least one of an inorganic material or an organic material. According to an embodiment, the first sensing insulating layer IIL1 and the second sensing insulating layer IIL2 may be inorganic layers. The inorganic layer includes at least one of aluminum oxide, titanium oxide, silicon oxide, silicon oxynitride, zirconium oxide, or hafnium oxide. The thickness of the inorganic layer may be between 1000 angstroms and 4000 angstroms.

The third sensing insulating layer IIL3 may be an organic layer. The organic layer includes at least one of an acrylate-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin. The third sensing insulating layer IIL3 prevents moisture from permeating into the first conductive layer ICL1 and the second conductive layer ICL2 from the outside.

Figure 5:
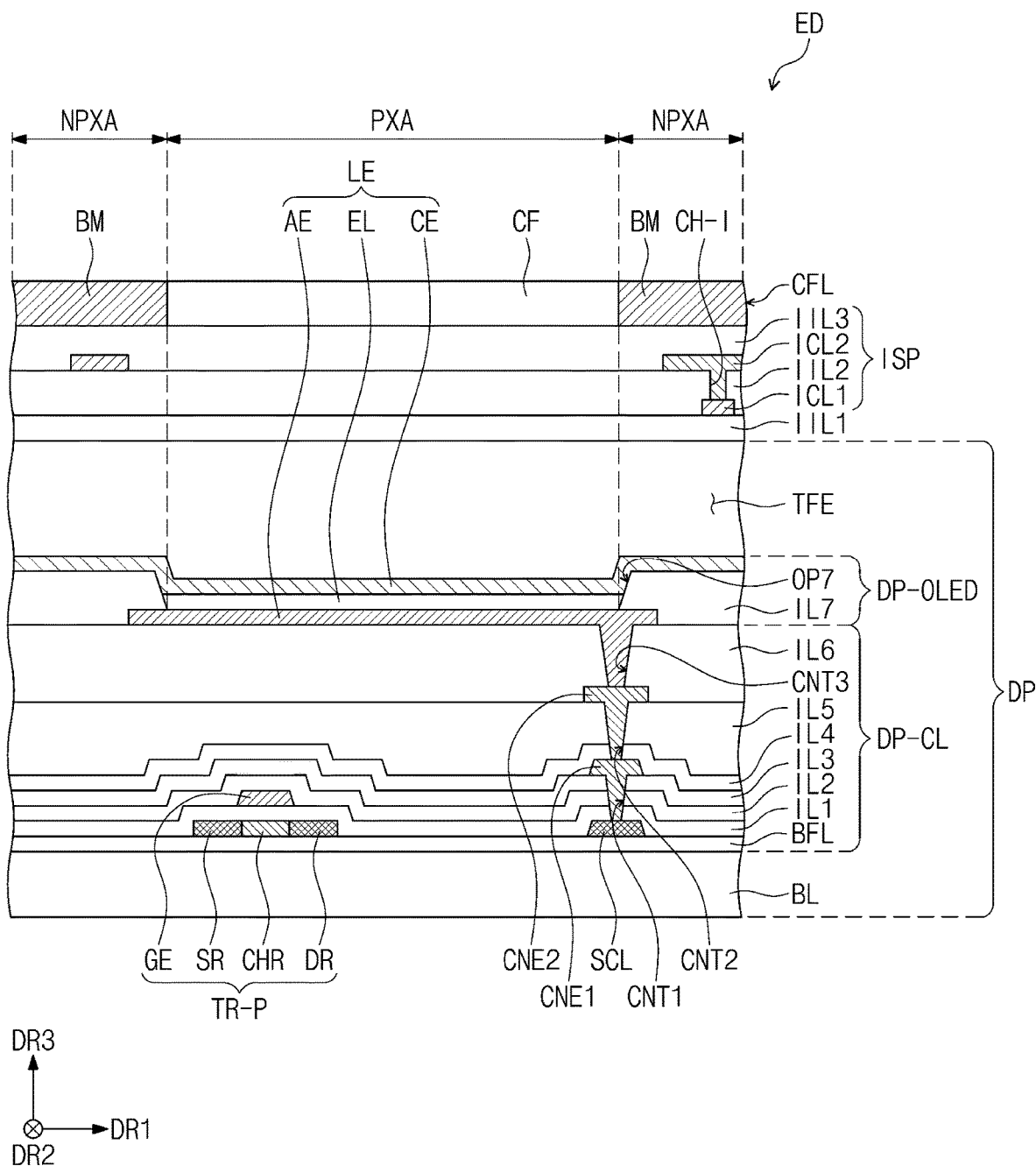
FIG. 5 is a cross-sectional view of an electronic device, according to an embodiment of the present disclosure.

FIG. 5 is a cross-sectional view of an electronic device, according to an embodiment of the present disclosure.

Referring to FIG. 5, in an embodiment, the electronic device ED includes the display panel DP and the input sensor ISP directly disposed on the display panel DP. The display panel DP includes the base layer BL, the circuit device layer DP-CL, the display device layer DP-OLED, and the encapsulating layer TFE.

Each of the display panel DP and the input sensor ISP include the active region AA and the peripheral region NAA. FIG. 5 is an enlarged view of a portion of the active region AA.

The base layer BL is a base surface for disposing the circuit device layer DP-CL. The circuit device layer DP-CL may be disposed on the base layer BL. The circuit device layer DP-CL includes an insulating layer, a semiconductor pattern, a conductive pattern, and a signal line. The insulating layer, a semiconductor layer, and a conductive layer may be formed on the base layer BL through a coating or deposition process, and may be selectively patterned through a plurality of photolithography processes. Thereafter, the semiconductor pattern, the conductive pattern, and the signal line in the circuit device layer DP-CL are formed.

At least one inorganic layer is disposed on a top surface of the base layer BL. According to an embodiment, the display panel DP is illustrated as including a buffer layer BFL. The buffer layer BFL increases a bonding force between the base layer BL and the semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. The semiconductor pattern includes polysilicon. However, embodiments are not necessarily limited thereto, and in other embodiments, the semiconductor pattern includes amorphous silicon or a metal oxide.

FIG. 5 illustrates some semiconductor patterns, and other semiconductor patterns are further disposed in other regions. The semiconductor patterns are arranged across pixels according to a specific rule. The semiconductor patterns have different electrical properties, depending on whether the patterns are doped. The semiconductor patterns include a first region that has higher conductivity and a second region that has lower conductivity. The first region is doped with an N-type dopant or a P-type dopant. A P-type transistor includes a doping region doped with the P-type dopants. The second region is a non-doping region or may be doped with a lighter concentration of dopants, as compared to the first region.

The first region is more conductive than of the second region, and serves as an electrode or a signal line. The second region corresponds to an active region or a channel region of a pixel transistor TR-P. For example, a portion of the semiconductor pattern is the active region of the transistor, and another portion of the semiconductor pattern is a source region or a drain region of the transistor.

Each of pixels may have an equivalent circuit that includes seven transistors, one capacitor, and a light emitting device, and the equivalent circuit of the pixel can be modified in various forms. FIG. 5 illustrates that the pixel includes one pixel transistor TR-P and one light emitting device LE, by way of example.

A source region SR, a channel region CHR, and a drain region DR of the pixel transistor TR-P are formed from the semiconductor pattern. The source region SR and the drain region DR extend in opposite directions to each other from the channel region CHR. FIG. 5 illustrates a portion of a signal transfer region SCL that is formed using the first region of the semiconductor pattern. In addition, the signal transfer region SCL is electrically connected with the pixel transistor TR-P, when viewed in a plan view.

A first insulating layer IL1 may be disposed on the buffer layer BFL. The first insulating layer IL1 may commonly overlaps a plurality of pixels, and the first insulating layer IL1 may covers the semiconductor pattern. The first insulating layer IL1 may be an inorganic layer and/or an organic layer, and may have a single-layer structure or a multi-layer structure. The first insulating layer IL1 includes at least one of aluminum oxide, titanium oxide, silicon oxide, silicon nitride, silicon oxynitride, zirconium oxide, or hafnium oxide. According to an embodiment, the first insulating layer IL1 is a silicon oxide layer that has a single-layer structure. The first insulating layer IL1 and an insulating layer of the circuit device layer DP-CL, which is to be described below, may be an inorganic layer and/or an organic layer, and may have a single-layer structure or a multi-layer structure. The inorganic layer includes, but is not necessarily limited to, at least one of the above-described materials.

A gate GE of the pixel transistor TR-P is disposed on the first insulating layer IL1. The gate GE may be a portion of a metal pattern. The gate GT overlaps the channel region CHR. The gate GT may function as a mask in a process of doping the semiconductor pattern.

A second insulating layer IL2 may be disposed on the first insulating layer IL1 and may cover the gate GT. The second insulating layer IL2 may be commonly provided on the pixels. The second insulating layer IL2 may be an inorganic layer and/or an organic layer, and may have a single-layer structure or a multi-layer structure. According to an embodiment, the second insulating layer IL2 is a silicon oxide layer that has a single-layer structure.

A third insulating layer IL3 may be disposed on the second insulating layer IL2. According to an embodiment, the third insulating layer IL3 is a silicon oxide layer that has a single-layer structure. A first connection electrode CNE1 may be disposed on the third insulating layer IL3. The first connection electrode CNE1 may be connected to the signal transfer region SCL through a contact hole CNT1 formed through the first insulating layer IL1, the second insulating layer IL2, and the third insulating layer IL3.

A fourth insulating layer IL4 may be disposed on the third insulating layer IL3 and may covers the first connection electrode CNE1. The fourth insulating layer IL4 may be a silicon oxide layer that has a single-layer structure. A fifth insulating layer IL5 may be disposed on the fourth insulating layer IL4. The fifth insulating layer IL5 may be an organic layer.

A second connection electrode CNE2 may be disposed on the fifth insulating layer IL5. The second connection electrode CNE2 may be connected to the first connection electrode CNE1 through a contact hole CNT2 formed through the fourth insulating layer IL4, and the fifth insulating layer IL5.

A sixth insulating layer IL6 may be disposed on the fifth insulating layer IL5 and may cover the second connection electrode CNE2. The sixth insulating layer IL6 may be an organic layer. The display device layer DP-OLED may be disposed on the circuit device layer DP-CL. The display device layer DP-OLED may be disposed on the sixth insulating layer IL6. The display device layer DP-OLED further includes the light emitting device LE. The light emitting device LE include a first electrode AE, a light emitting layer EL, and a second electrode CE. For example, the light emitting layer EL includes one of an organic light emitting material, a quantum dot, a quantum rod, a micro-LED, or a nano-LED.

The first electrode AE may be disposed on the sixth insulating layer IL6. The first electrode AE may be connected to the second connection electrode CNE2 through a contact hole CNT3 formed through the sixth insulating layer IL6.

A pixel defining layer IL7 may be disposed on the sixth insulating layer IL6 and may cover a portion of the first electrode AE. An opening OP7 is formed in the pixel defining layer IL7. The opening OP7 of the pixel defining layer IL7 exposes at least a portion of the first electrode AE. According to an embodiment, a light emitting region PXA is defined by is exposed by the opening OP7 that corresponds to the exposed portion of the first electrode AE. A non-light emitting region NPXA surrounds the light emitting region PXA.

The light emitting layer EL may be disposed on the first electrode AE. The light emitting layer EL may be disposed in the opening OP7. For example, the light emitting layer EL is separately formed for each pixel. When the light emitting layer EL is separately formed for each pixel, each of the light emitting layers EL emits at least one of blue light, red light, or green light. However, embodiments of the present disclosure are not necessarily limited thereto, and in an embodiment, the light emitting layer EL is connected with the pixels and commonly provided for the pixels. For example, the light emitting layer EL emits blue light or white light.

The second electrode CE may be disposed on the light emitting layer EL. The second electrode CE, which has the form of one integrated body, is commonly disposed for the plurality of pixels. The second electrode CE receives a common voltage and may be referred to as a common electrode.

In addition, a hole control layer is interposed between the first electrode AE and the light emitting layer EL. The hole control layer is commonly disposed in the light emitting region PXA and the non-light emitting region NPXA. The hole control layer includes a hole transport layer and a hole injection layer. An electron control layer is interposed between the light emitting layer EL and the second electrode CE. The electron control layer includes an electron transport layer and an electron injection layer. The hole control layer and the electron control layer are commonly formed in the pixels by using an open mask.

The input sensor ISP is formed on the top surface of the encapsulating layer TFE through sequential processes. The input sensor ISP includes the first sensing insulating layer IIL1, the first conductive layer ICL1, the second sensing insulating layer IIL2, the second conductive layer ICL2, and the third sensing insulating layer IIL3. In an embodiment, the first sensing insulating layer IIL1 is omitted Each of the first conductive layer ICL1 and the second conductive layer ICL2 may have a single-layer structure or a multi-layer structure that is stacked in the third direction DR3. A conductive layer in a single-layer structure includes a metal layer or a transparent conducive layer. The metal layer includes at least one of molybdenum, silver, titanium, copper, aluminum, or an alloy thereof. The transparent conductive layer includes a transparent conductive oxide, such as indium tin oxide (ITO), indium zinc oxide (IZO), zinc oxide (ZnO), or indium zinc tin oxide (IZTO). In addition, the transparent conductive layer includes a conductive polymer such as PEDOT, a metal nano-wire, or graphene.

A conductive layer in a multi-layer structure includes metal layers. The metal layers have, for example, a three-layer structure of titanium/aluminum/titanium. The conductive layer in a multi-layer structure includes at least one metal layer and at least one transparent conductive layer.

The second conductive layer ICL2 is connected to the first conductive layer ICL1 by a contact hole CH-1 formed through the second sensing insulating layer IIL2.

The second sensing insulating layer IIL2 covers the first conductive layer ICL1 and the third sensing insulating layer IIL3 covers the second conductive layer ICL2. Although the first sensing insulating layer IIL1 to the third sensing insulating layer IIL3 are illustrated as being a single-layer, embodiments of the present disclosure are not necessarily limited thereto.

At least one of the first sensing insulating layer IIL1 or the second sensing insulating layer IIL2 includes an inorganic film. The inorganic film includes at least one of aluminum oxide, titanium oxide, silicon oxide, silicon nitride, silicon oxynitride, zirconium oxide, or hafnium oxide.

The third sensing insulating layer IIL3 may include an organic film. The organic film includes at least one of an acrylate-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin.

A color filter layer CFL and a light blocking pattern BM may be disposed on the input sensor ISP. The light blocking pattern BM prevents external light from being reflected. The light blocking pattern BM may be disposed in the same layer as the color filter layer CFL. The color filter layer CFL may include a plurality of color filters CF. The color filters CF are disposed in the light emitting region PXA. The light blocking pattern BM is disposed in the non-light emitting region NPXA FIG. 6 is a plan view of an input sensor, according to an embodiment of the present disclosure.

Figure 6:
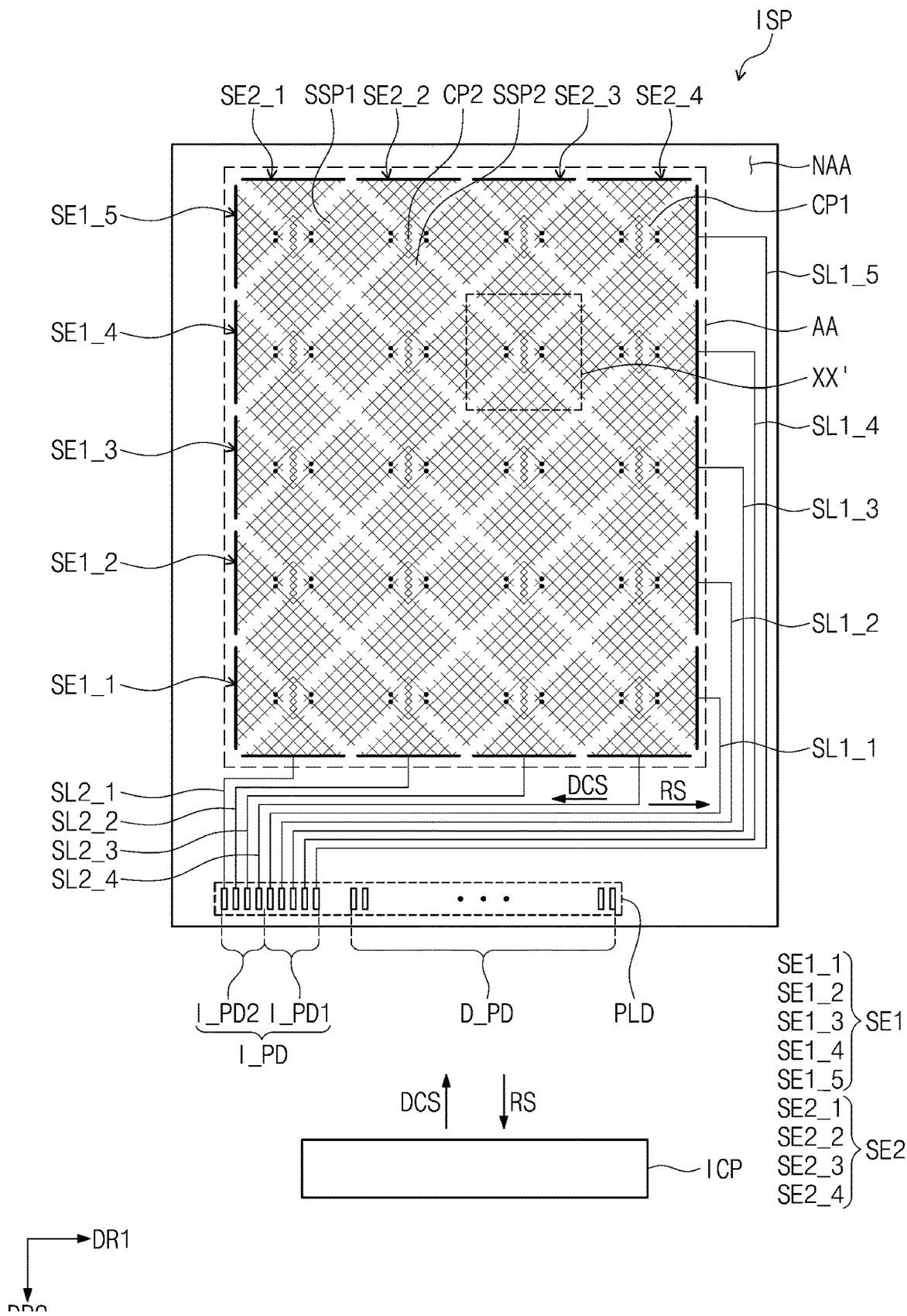
FIG. 6 is a plan view of an input sensor, according to an embodiment of the present disclosure.

Referring to FIG. 6, in an embodiment, the input sensor ISP according to an embodiment of the present disclosure includes the active region AA and the peripheral region NAA adjacent to the active region AA. The plurality of sensing electrodes SE1_1 to SE1_5 and SE2_1 to SE2_4 may be disposed in the active region AA, and the plurality of signal lines SL1_1 to SL1_5 and SL2_1 to SL2_4 may be disposed in the peripheral region NAA.

According to an embodiment, the sensing electrodes SE1_1 to SE1_5 and SE2_1 to SE2_4 include a first sensing electrode SE1 and a second sensing electrode SE2. One of each of the first sensing electrodes SE1 and the second sensing electrode SE2 is a receive electrode and another of each the first sensing electrodes SE1 and the second sensing electrodes SE2 is a transmit electrode. For example, the first sensing electrode SE1 is the receive electrode SE1 and the second sensing electrode SE2 is the transmit electrode SE2. A plurality of receive electrodes SE1 and a plurality of transmit electrodes SE2 are provided, respectively. The sensing electrodes SE1_1 to SE1_5 and SE2_1 to SE2_4 may include receive electrodes SE1_1 to SE1_5 and transmit electrodes SE2_1 to SE2_4. Hereinafter, in an embodiment, the first sensing electrode SE1 will be described as a receive electrode SE1 and the second sensing electrode SE2 will be described as a transmit electrode SE2.

The signal lines to SL1_1 to SL1_5 and SL2_1 to SL2_4 include receive signal lines SL1_1 to SL1_5 connected to the receive electrodes SE1_1 to SE1_5 and transmit signal lines SL2_1 to SL2_4 connected to the transit it electrodes SE2_1 to SE2_4. The receive signal lines SL1_1 to SL1_5 may be referred to as first signal lines. The transmit signal lines SL2_1 to SL2_4 may be referred to as second signal lines.

The receive electrodes SE1_1 to SE1_5 and the transmit electrodes SE2_1 to SE2_4 cross each other. The receive electrodes SE1_1 to SE1_5 are arranged in the second direction DR2 and extend in the first direction DR1. The transmit electrodes SE2_1 to SE2_4 are arranged in the first direction DR1 and extend in the second direction DR2.

The input sensor ISP may acquire coordinate information using mutual-capacitance. Capacitances are formed between the receive electrodes SE1_1 to SE1_5 and the transmit electrodes SE2_1 to SE2_4. The capacitances between the receive electrodes SE1_1 to SE1_5 and the transmit electrodes SE2_1 to SE2_4 are changed by art external input of a user's body. According to an embodiment of the present disclosure, the capacitances between the receive electrodes SE1_1 to SE1_5 and the transmit electrodes SE2_1 to SE2_4 are changed by an external input caused by an input device other than a user's body. For example, the sensing sensitivity of the input sensor ISP is determined by the variation in capacitance.

However, embodiments of the present disclosure are not necessarily limited thereto, and in an embodiment, the input sensor ISP acquires coordinate information through self-capacitance. In an embodiment, the receive electrodes SE1_1 to SE1_5 and the transmit electrodes SE2_1 to SE2_4 are integrated into one sensing electrode to sense art external input.

According to an embodiment, the input sensor ISP is not limited to a mutual capacitance sensor or a self-capacitance sensor when obtaining coordinate information. The input sensor ISP can acquire coordinate information by using both mutual capacitance and self-capacitance.

Each of the receive electrodes SE1_1 to SE1_5 includes first sensor parts SSP1 and first connection parts CP1 disposed in the active region AA. Each of the transmit electrodes SE2_1 to SE2_4 includes second sensor parts SSP2 and second connection parts CP2 disposed in the active region AA.

Each of two first sensor parts of the first sensor parts SSP1 disposed at opposite ends of one receive electrode is smaller, e.g., ½ size, than a first sensor part disposed at the center. Each of two second sensor parts of the second sensor parts SSP2 disposed at opposite ends of one transmit electrode is smaller, e.g., ½ size, than a second sensor part disposed at the center.

Although FIG. 6 illustrates the receive electrodes SE1_1 to SE1_5 and the transmit electrodes SE2_1 to SE2_4 according to an embodiment as having the shape of a rhombus, the shapes of the receive electrodes SE1_1 to SE1_5 and the transmit electrodes SE2_1 to SE2_4 are not necessarily limited thereto. According to an embodiment of the present disclosure, each of the receive electrodes SE1_1 to SE1_5 or each of the transmit electrodes SE2_1 to SE2_4 has a form, such as a bar shape, in which a sensor part and a connection part are not distinguished from each other. Although each of the first sensor parts SSP1 or each of the second sensor parts SSP2 has the shape of a rhombus, embodiments of the present disclosure are not necessarily limited thereto. For example, in an embodiment, the first sensor parts SSP1 and the second sensor parts SSP2 have mutually different polygonal shapes.

The first sensor parts SSP1 are arranged in the second direction DR2 in one receive electrode, and the second sensor parts SSP2 are arranged in the first direction DR1 in one transmit electrode. Each of the first connection parts CP1 connects adjacent first sensor parts SSP1 to each other, and each of the second connection parts CP2 connects adjacent second sensor parts SSP2 to each other.

Each of the receive electrodes SE1_1 to SE1_5 and the transmit electrodes SE2_1 to SE2_4 has a mesh shape. Each of the receive electrodes SE1_1 to SE1_5 and the transmit electrodes SE2_1 to SE2_4 has a mesh shape that reduces a parasitic capacitance with electrodes that are included in the display panel DP (see FIG. 2).

The mesh-shaped receive electrodes SE1_1 to SE1_5 and transmit electrodes SE2_1 to SE2_4 include, but are not necessarily limited to, silver, aluminum, copper, chromium, nickel, or titanium.

The receive signal lines SL1_1 to SL1_5 and the transmit signal lines SL2_1 to SL2_4 may be disposed in the peripheral region NAA.

The input sensor ISP includes input pads I_PD that extend from ends of the receive signal lines SL1_1 to SL1_5 and the transmit signal lines SL2_1 to SL2_4 and are disposed in the peripheral region NAA. The input pads I_PD are electrically connected to the receive signal lines SL1_1 to SL1_5 and the transmit signal lines SL2_1 to SL2_4, respectively. According to an embodiment of the present disclosure, the input pads I_PD include receive input pads I_PD1, to which the receive signal lines SL1_1 to SL1_5 are electrically connected, and transmit input pads I_PD2 to which the transmit signal lines SL2_1 to SL2_4 are electrically connected.

According to an embodiment of the present disclosure, a pad region PLD, in which the input pads I_PD are disposed, is included in the peripheral region NAA.

The pad region PLD may further include pixel pads D_PD that connect the flexible circuit film FCB (see FIG. 2) to the display panel DP (see FIG. 2).

The electronic device ED may further include a sensing driver ICP that controls driving of the input sensor ISP.

According to an embodiment of the present disclosure, the sensing driver ICP is electrically connected to the input sensor ISP. The sensing driver ICP is electrically connected to the receive signal lines SL1_1 to SL1_5 and the transmit signal lines SL2_1 to SL2_4, respectively.

The sensing driver ICP transmits a driving control signal DCS to the transmit electrodes SE2_1 to SE2_4, and receives sensing signals RS that reflect a variation in a capacitance between the transmit electrodes SE2_1 to SE2_4 and the receive electrodes SE1_1 to SE1_5 from the receive electrodes SE1_1 to SE1_5. For example, according to an embodiment of the present disclosure, the driving control signal DCS includes sensing scan signals that are sequentially transmitted to the transmit electrodes SE2_1 to SE2_4. The sensing driver ICP may drive the input sensor ISP in a first manner and/or second manner. The first manner may use mutual-capacitance. The second manner may use self-capacitance.

Figure 7:
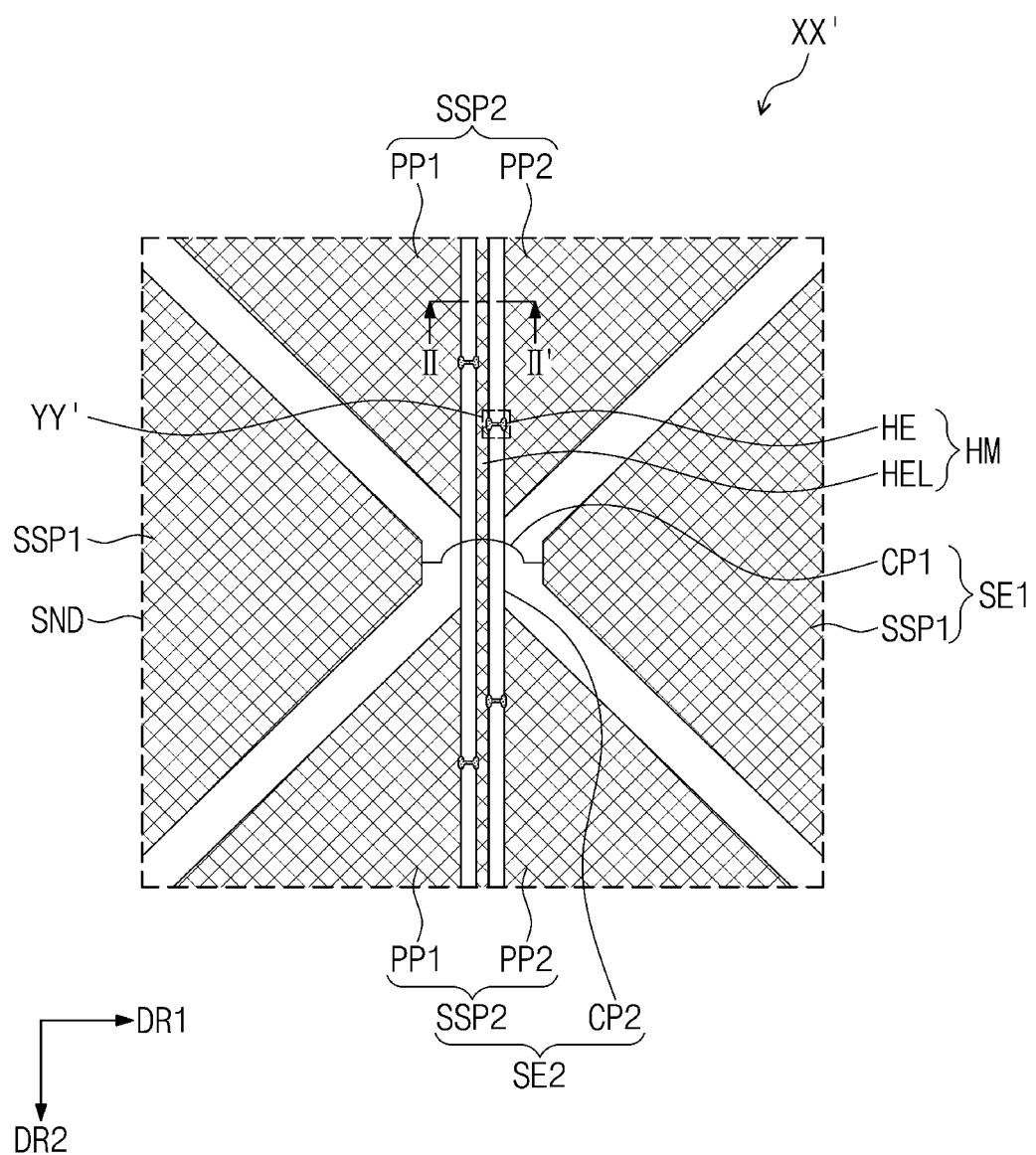
FIG. 7 is an enlarged view of a sensor unit, according to an embodiment of the present disclosure.

According to an embodiment, FIG. 7 illustrates at least one heat generating module HM disposed on the input sensor ISP. Each of a plurality of heat generating modules HM includes a heat generating electrode HEL and a heat generating device HE. The heat generating module HM generates heat through the heat generating device HE, when the internal temperature of the electronic device ED is low. For example, the heat generating module HM compensates for the temperature of the electronic device ED. The electronic device ED lowers the modulus by the temperature compensating operation of the heat generating module and reduces the occurrence rate of cracks when folded. Hereinafter, the heat generating module HM will be described in detail with reference to FIGS. 7 to 10.

Figure 8:
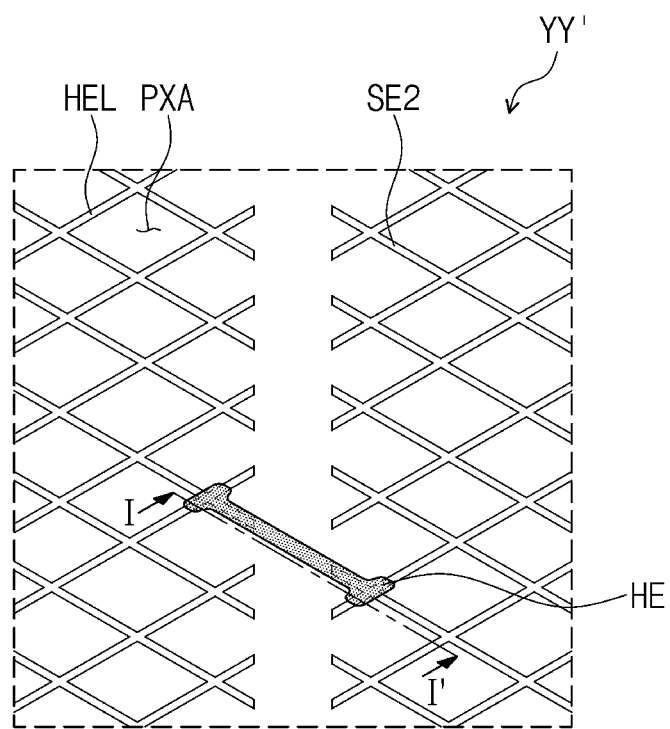
FIG. 8 is an enlarged view of a region YY' of FIG. 7.

FIG. 7 is an enlarged view of a sensor unit, according to an embodiment of the present disclosure. FIG. 7 is an enlarged view of a region XX' of FIG. 6. FIG. 8 is an enlarged view of a region YY' of FIG. 7.

In an embodiment, the input sensor ISP (see FIG. 6) includes a plurality of sensor units SND. The first sensing electrode SE1, the second sensing electrode SE2, and the heat generating module HM are disposed in each of the plurality of sensor units SND. A plurality of heat generating devices HE are respectively disposed in each of the corresponding plurality of sensor units SND.

Referring to FIG. 7, in an embodiment, the electronic device ED includes the heat generating module HM. The heat generating module HM includes the heat generating electrode HEL and the heat generating device HE. The heat generating module HM generates heat, as the heat generating device HE emits heat through a current that flows to the heat generating electrode HEL. The heat generating module HM is connected to the sensing driver ICP (see FIG. 6) to bias the current to the heat generating electrode HEL to generate the heat, depending on the resistance of the heat generating device HE.

The heat generating electrode HEL is disposed in the same layer as the first sensing electrode SE1 and the second sensing electrode SE2. According to an embodiment, the heat generating electrode HEL is disposed adjacent to the second sensing electrode SE2 of the input sensor ISP. For example, the heat generating electrode HEL crosses the second sensing electrode SE2. The second sensing electrode SE2 includes a first part PP1 and a second part PP2. The first part PP1 and the second part PP2 are connected to each other through a relevant second signal line of the second signal lines SL2_1 to SL2_4.

The heat generating electrode HEL is interposed between the first part PP1 and the second part PP2. The heat generating electrode HEL is connected to the sensing driver ICP through a separate signal line. The heat generating electrode HEL extends in the second direction DR2, similar to the second sensing electrode SE2. The heat generating electrode HEL has a mesh shape. The heat generating electrode HEL is not directly connected to the first sensing electrode SE1 and the second sensing electrode SE2. The heat generating electrode HEL is electrically connected to the second sensing electrode SE2, which is a transmit electrode, through the heat generating device HE.

The heat generating device HE connects the second sensing electrode SE2 to the heat generating electrode HEL. The plurality of heat generating devices HE are provided in the active region AA. The plurality of heat generating devices HE are provided within one sensor unit SND. Although FIG. 7 illustrates four heat generating devices HE, embodiments of the present disclosure are not necessarily limited thereto.

The heat generating device HE connects the first part PP1 to the heat generating electrode HEL. The heat generating device HE connects the second part PP2 to the heat generating electrode HEL. The heat generating device HE connects the transmit electrode SE2 to the heat generating electrode HEL to drive the heat generating module HM in response to the driving control signal DCS of the transmit electrode SE2. For example, the transmit electrode SE2 drives the input sensor ISP and the heat generating module HM.

The heat generating device HE may include a conductor that emits heat in proportion to the resistance. The heat generating device HE may include a conductor material that has higher resistance and higher thermal conductivity. For example, the heat generating device HE includes at least one of a metal oxide, nickel chromium, or a carbon-based material. The details thereof will be described with reference to FIG. 11.

In FIG. 7, the first sensing electrode SE1 includes a first sensor part SSP1 and a first connection part CP1. The second sensing electrode SE2 includes a second sensor part SSP2 and a second connection part CP2. The first connection part CP1 crosses the second connection part CP2. The second connection part CP2 extends in the same layer as the second sensor part SSP2. The first connection part CP1 is disposed in a different layer from the first sensor part SSP1 and is connected to the first sensor part SSP1 through a contact hole. Although FIG. 7 illustrates that the first connection part CP1 is disposed in the different layer, embodiments of the present disclosure are not necessarily limited thereto. For example, in an embodiment, the second connection part CP2 is disposed in a different layer, and the first connection part CP1 extends from the first sensor part SSP1 in the same layer.

FIG. 8 illustrates the second sensing electrode SE2 and the heat generating electrode HEL. The second sensing electrode SE2 and the heat generating electrode HEL are not directly connected to each other and are spaced apart from each other. The heat generating device HE connects the heat generating electrode HEL and the second sensing electrode SE2.

In FIG. 8, in an embodiment, the second sensing electrode SE2 and the heat generating electrode HEL have a mesh shape that prevents the light emitting region PXA from being covered. A portion of the heat generating device HE is disposed in the non-light emitting region NPXA (see FIG. 9) to prevent the light emitting region PXA from being covered where the mesh-shaped heat generating electrode HEL and the second sensing electrode SE2 are disposed. For example, the heat generating device HE overlaps the mesh patterns of the heat generating electrode HEL and the second sensing electrode SE2.

Figure 9:
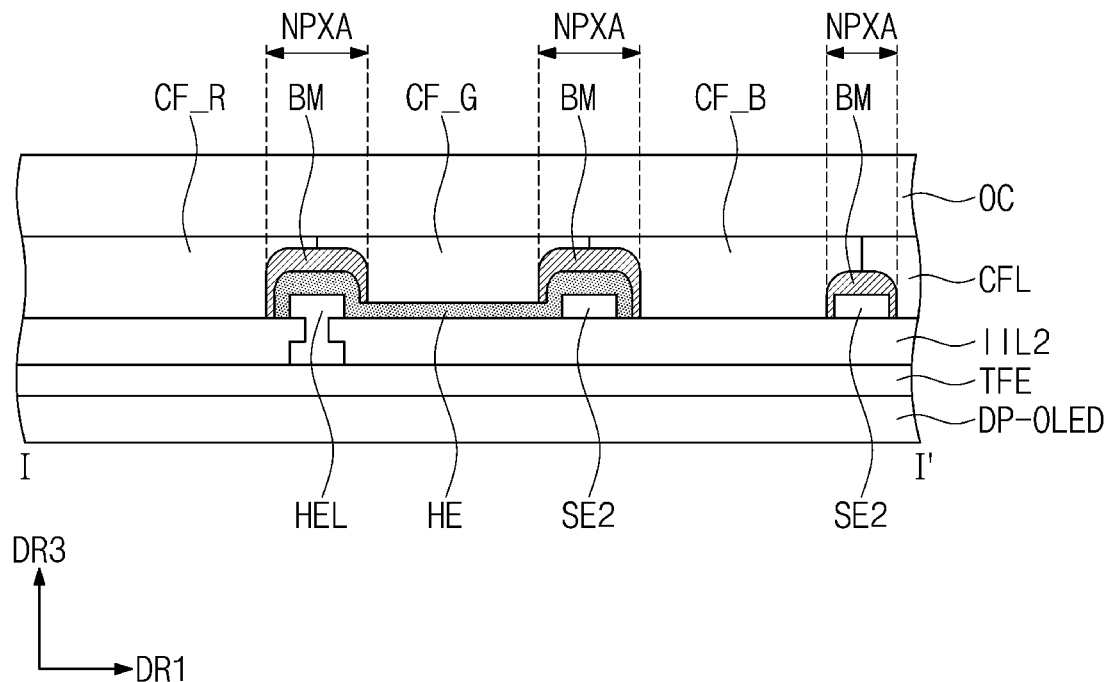
FIG. 9 is a cross-sectional view taken along line I-I' of FIG. 8.
Figure 10:
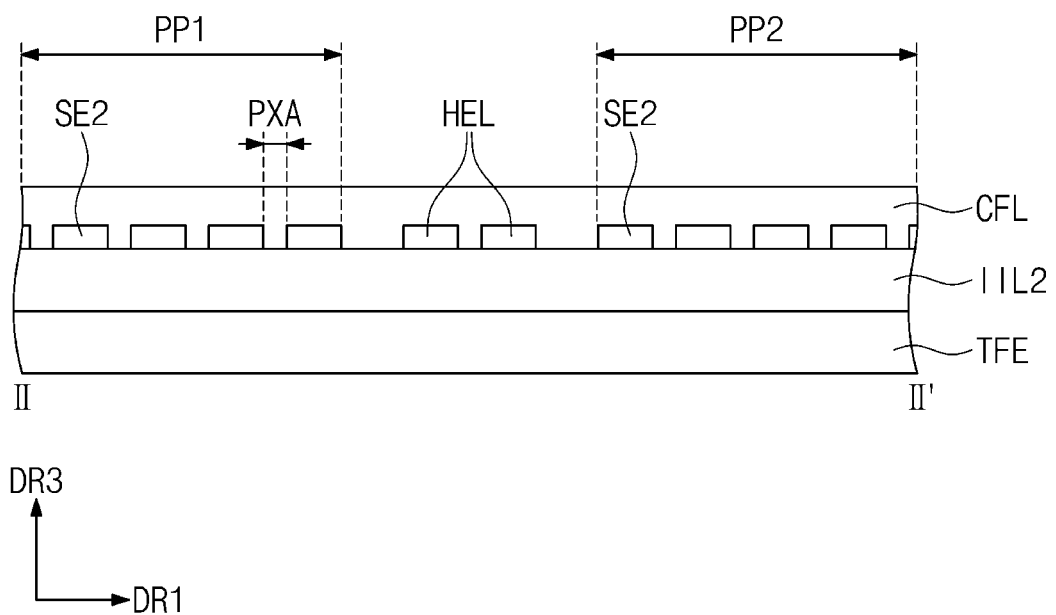
FIG. 10 is a cross-sectional view taken along line II-II' of FIG. 7.

FIG. 9 is a cross-sectional view taken along line I-I' of FIG. 8. FIG. 10 is a cross-sectional view taken along line II-II' of FIG. 7. For convenience of illustration, the first insulating layer IIL1 is not shown in FIGS. 9 and 10.

Referring to FIGS. 9 and 10, in an embodiment, the heat generating, device HE covers the second sensing electrode SE2 and the heat generating electrode HEL. The light blocking pattern BM is disposed on the heat generating device HE. The light blocking pattern BM is disposed throughout the whole area of the non-light emitting region NPXA. The heat generating device HE is disposed in a portion of the non-light emitting region NPXA. The light blocking pattern BM is disposed on the sensor electrodes SE1 and SE2. In FIG. 9, the light blocking pattern BM is disposed on the second sensing electrode SE2. However, when the heat generating device HE is disposed on the second sensing electrode SE2, the light blocking pattern BM is disposed on the heat generating device HE.

The second sensing electrode SE2 and the heat generating electrode HEL are disposed on the second insulating layer IIL2. For example, the second sensing electrode SE2 and the heat generating electrode HEL are disposed in the second conductive layer ICL2. At least one of the heat generating electrode HEL and the second sensing electrode SE2 is disposed on the encapsulating layer TFE and the second insulating layer IIL2 such that the heat generating electrode HEL and the second sensing electrode SE2 are connected to each other through a contact hole. Although FIG. 9 illustrates that the heat generating electrode HEL is disposed on the encapsulating layer TFE and the second insulating layer IIL2, embodiments are not necessarily limited thereto. In an embodiment, the heat generating electrode HEL is disposed on the second insulating layer IIL2, and the second sensing electrode SE2 is disposed on the encapsulating layer TFE and the second insulating layer IIL2.

The heat generating device HE may be covered by the color filter layer CFL. The color filter layer CFL may include a first color filter CF_R, a second color filter CF_G, and a third color filter CF_B. A planarization layer OC is disposed on the color filter layer CFL. The planarization layer OC planarizes the color filter layer CFL, such that the window WM can be disposed on the planarization layer OC.

FIG. 10 shows the heat generating electrode HEL and the second sensing electrode SE2 as including mesh lines. The light emitting region PXA may be defined between adjacent mesh lines. Although two mesh lines are illustrated in the heat generating electrode HEL, embodiments of the present disclosure are not necessarily limited thereto.

Figure 11:
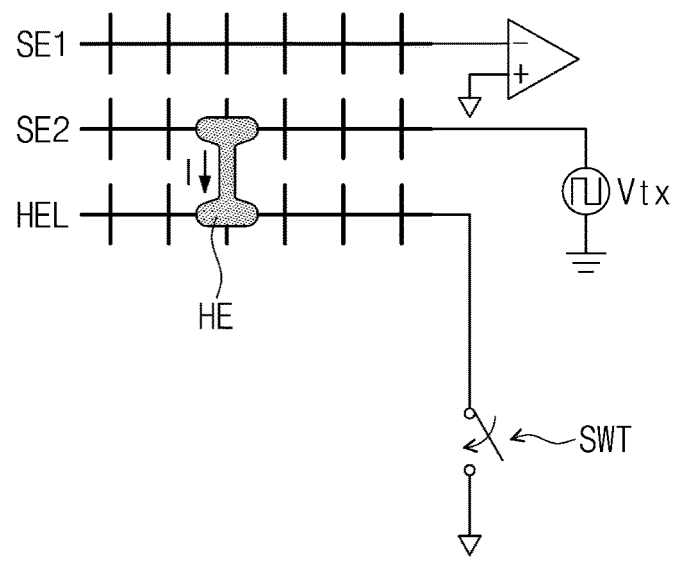
FIG. 11 illustrates a method of driving a heat generating module, according to an embodiment of the present disclosure.

FIG. 11 illustrates a method of driving a heat generating module according to an embodiment of the present disclosure. FIG. 11 schematically illustrates mesh shapes of the first sensing electrode SE1, the second sensing electrode SE2, and the heat generating electrode HEL.

In an embodiment, the transmit electrode SE2 is driven by a driving voltage Vtx. A current I flows from the transmit electrode SE2 to the heat generating electrode HEL through the heat generating device HE. The heat generating electrode HEL is connected to a switch SWT. The heat generating module HM can be turned on or off by operation of the switch SWT. For example, when the switch SWT is turned off, no current flows through the heat generating electrode HEL. Accordingly, the heat generating device HE does not generate heat.

The heat generating module HM is connected to the sensing driver ICP. The sensing driver ICP controls the switch SWT connected to the heat generating electrode HEL. The sensing driver ICP turns the switch SWT connected to the heat generating electrode HEL on or off, based on temperature information of the input sensor ISP. The electronic device ED includes a plurality of heat generating modules HM disposed on the input sensor ISP. The sensing driver ICP selectively drives some heat generating modules HM of the plurality of heat generating modules HM. For example, the sensing driver ICP turns on the switch SWT connected to some heat generating modules HM and turns off the switch SWT connected to other heat generating modules HM. The sensing driver ICP senses a temperature for each position inside the input sensor ISP to turn on the switch SWT of the heat generating module HM that has a lower temperature, and turn off the switch SWT of the heat generating module HM that has a higher temperature.

The position of the switch SWT connected to the heat generating electrode HEL is not necessarily limited. According to an embodiment, the switch SWT is disposed in the sensing driver ICP. In an embodiment, the switch SWT is disposed in the active region AA. In some embodiments, the switch SWT is disposed on the main circuit board MCB (see FIG. 2) or the flexible circuit film FCB (see FIG. 2).

Figure 12:
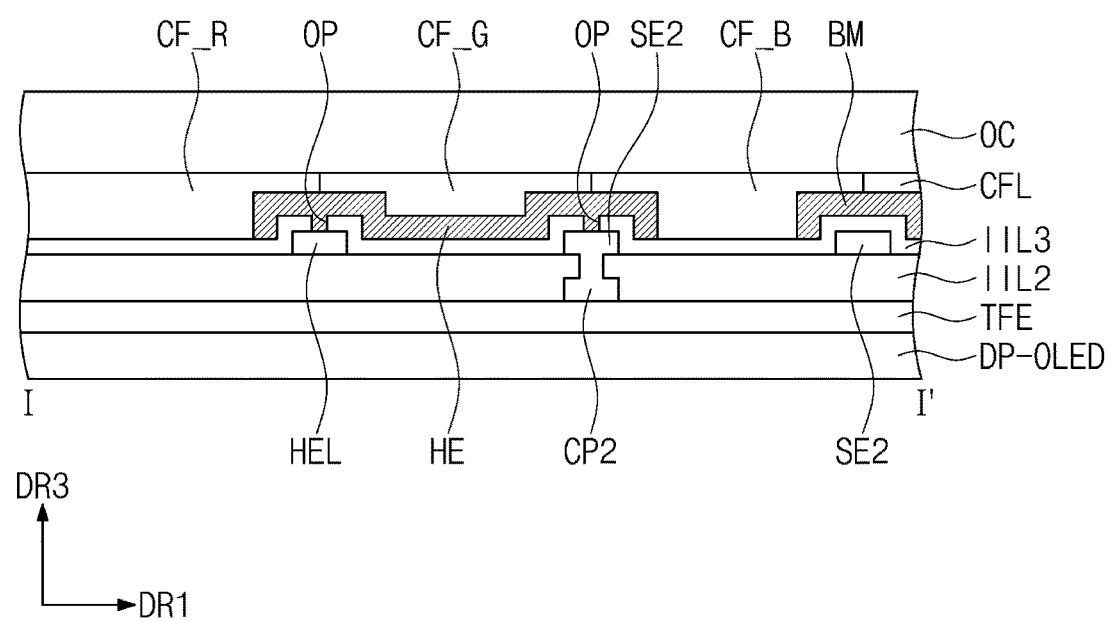
FIG. 12 is a cross-sectional view of an input sensor, according to an embodiment of the present disclosure.

FIG. 12 is a cross-sectional view of an input sensor, according to an embodiment of the present disclosure. In the following, description of components described with reference to FIG. 9 will be omitted. For convenience of illustration, the first insulating layer IIL1 is not shown in FIG. 12.

In FIG. 12, according to an embodiment, the light blocking pattern BM is not be separately disposed on the heat generating device HE. The heat generating device HE functions as the light blocking pattern BM. For example, the heat generating device HE includes a low reflectance material that is similar to the light blocking pattern BM. The heat generating device HE includes a conducting material that has a lower reflectance, a higher resistance, and higher thermal conductivity. For example, the reflectance of the heat generating device HE is reduced, as a high resistance and high thermally-conductive conductive material is carbonized to blacken the surface of the heat generating device HE.

The heat generating device HE reflects external light and electrically connects the second sensing electrode SE2 and the heat generating electrode HEL.

The heat generating device HE may be disposed on the third sensing insulating layer IIL3. The third sensing insulating layer IIL3 may be disposed on the second sensing insulating layer IIL2. The third sensing insulating layer IIL3 may include an opening part OP. The heat generating device HE may electrically connect the second sensing electrode SE2 to the heat generating electrode HEL through the opening part OP.

Figure 13:
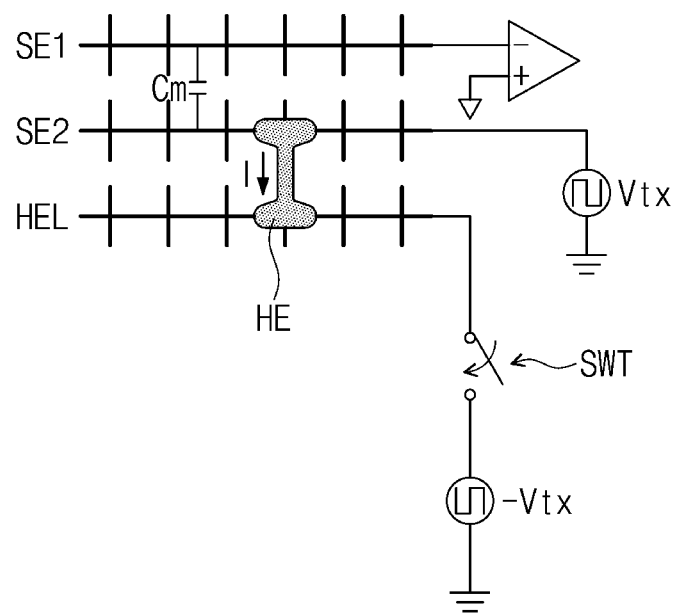
FIG. 13 illustrates a method of driving a heat generating module, according to an embodiment of the present disclosure.

FIG. 13 illustrates a method of driving a heat generating module, according to an embodiment of the present disclosure. In the following, descriptions of components described with reference to FIG. 11 will be omitted.

In FIG. 13, a voltage −Vtx having a phase reverse to a phase of a driving voltage Vtx applied to the second sensing electrode SE2 is applied to the heat generating electrode HEL. For example, the reverse potential voltage −Vtx is applied to the heat generating electrode HEL to increase a potential difference with the driving voltage Vtx. When the potential difference is increased, a quantity of current flowing through the heat generating device HE increases, such that the heat generating device HE emits more heat. The voltage −Vtx in FIG. 13 is provided by way of example, and in an embodiment, another voltage, such as −2Vtx, is applied.

Figure 14A:
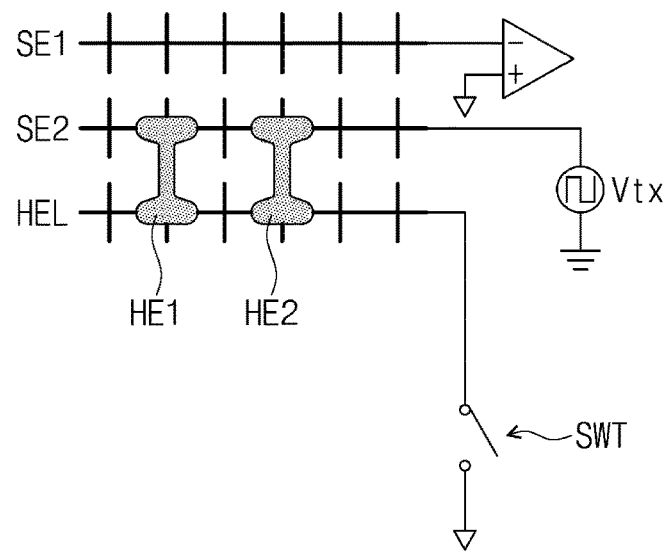
FIGS. 14A to 14C illustrate a method of driving a heat generating module, according to an embodiment of the present disclosure.
Figure 14B:
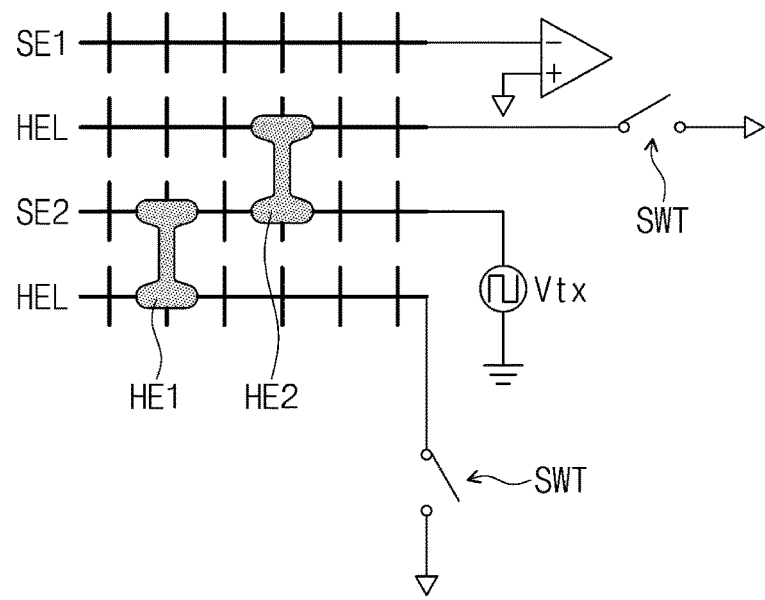
Figure 14C:
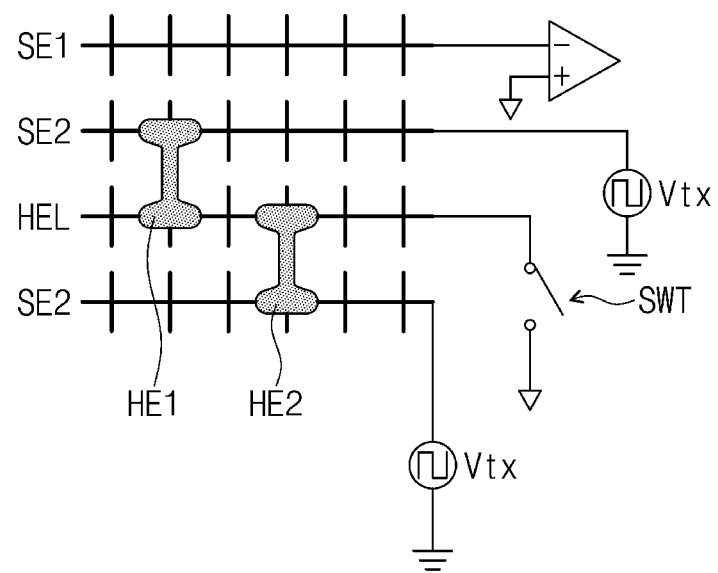

FIGS. 14A to 14C illustrate a method of driving a heat generating module, according to an embodiment of the present disclosure. FIGS. 14A to 14C illustrate embodiments that differs from an embodiment of FIG. 11. In addition, the phase reverse voltage −Vtx is applied to the heat generating electrodes HEL in FIGS. 14A to 14C.

In FIG. 14A, in an embodiment, first and second heat generating devices HE1 and HE2 are interposed between the heat generating electrode HEL and the second sensing electrode SE2. The first heat generating device HE1 and the second heat generating device HE2 are spaced apart from each other. Although two heat generating devices HE1 and HE2 are illustrated in FIG. 14A, embodiments are not necessarily limited thereto. In an embodiment, two or more heat generating devices are provided.

In FIG. 14B, in an embodiment, a plurality of heat generating electrodes HEL may be provided. The plurality of heat generating electrodes HEL are connected to one adjacent second sensing electrode SE2. One second sensing electrode SE2 can be connected to one adjacent heat generating electrode HEL through the first heat generating device HE1, and can be connected to another adjacent heat generating electrode HEL through the second heat generating device HE2. Although one first heat generating device HE1 and one second heat generating device HE2 are illustrated, embodiments are not necessarily limited thereto, and in some embodiments, a plurality of heat generating devices HE1 and a plurality of second heat generating devices HE2 are provided. A switch SWT is connected to each of the plurality of heat generating electrodes HEL.

In FIG. 14C, in an embodiment, the heat generating electrode HEL is interposed between the plurality of second sensing electrodes SE2. One heat generating electrode HEL is connected to a plurality of adjacent second sensing electrodes SE2. The heat generating electrode HEL is connected to two adjacent second sensing electrodes SE2 through a first heat generating device HE1 and a second heat generating device HE2. Although one first heat generating device HE1 is illustrated, embodiments are not necessarily limited thereto, and in some embodiments, a plurality of first heat generating devices HE1 are provided. Similarly, in some embodiment, a plurality of second heat generating devices HE2 are provided. In FIGS. 14A to 14C, a plurality of heat generating electrodes HEL are connected to one sensing driver ICP (see FIG. 6). The sensing driver ICP individually controls the plurality of switches SWT. The sensing driver ICP controls the switches SWT based on the internal temperature of the input sensor ISP. The internal temperature of the input sensor ISP is sensed by a temperature sensor. Hereinafter, a temperature sensor will be described.

Figure 15A:
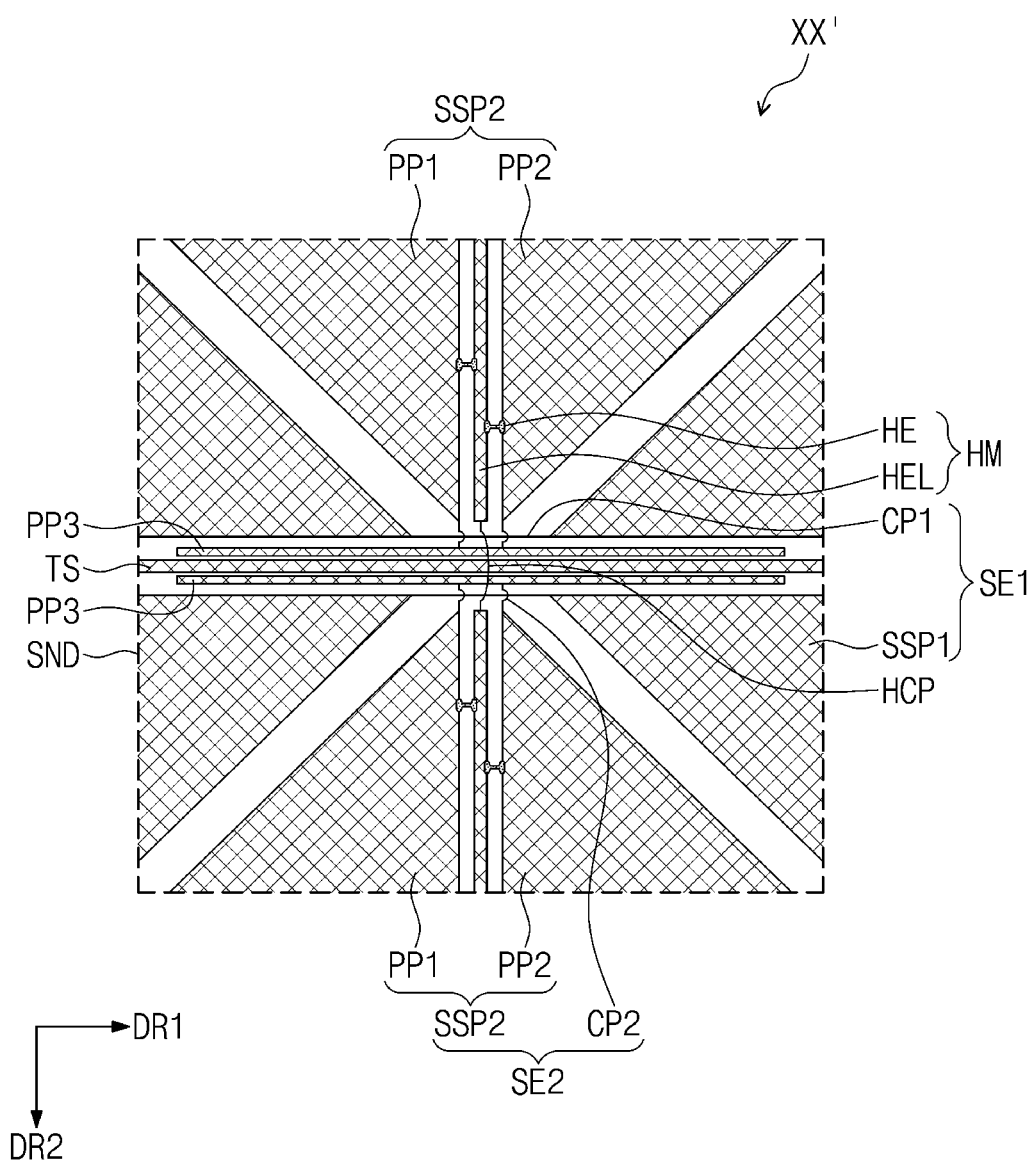
FIGS. 15A and 15B are enlarged views of a sensor unit, according to an embodiment of the present disclosure.
Figure 15B:
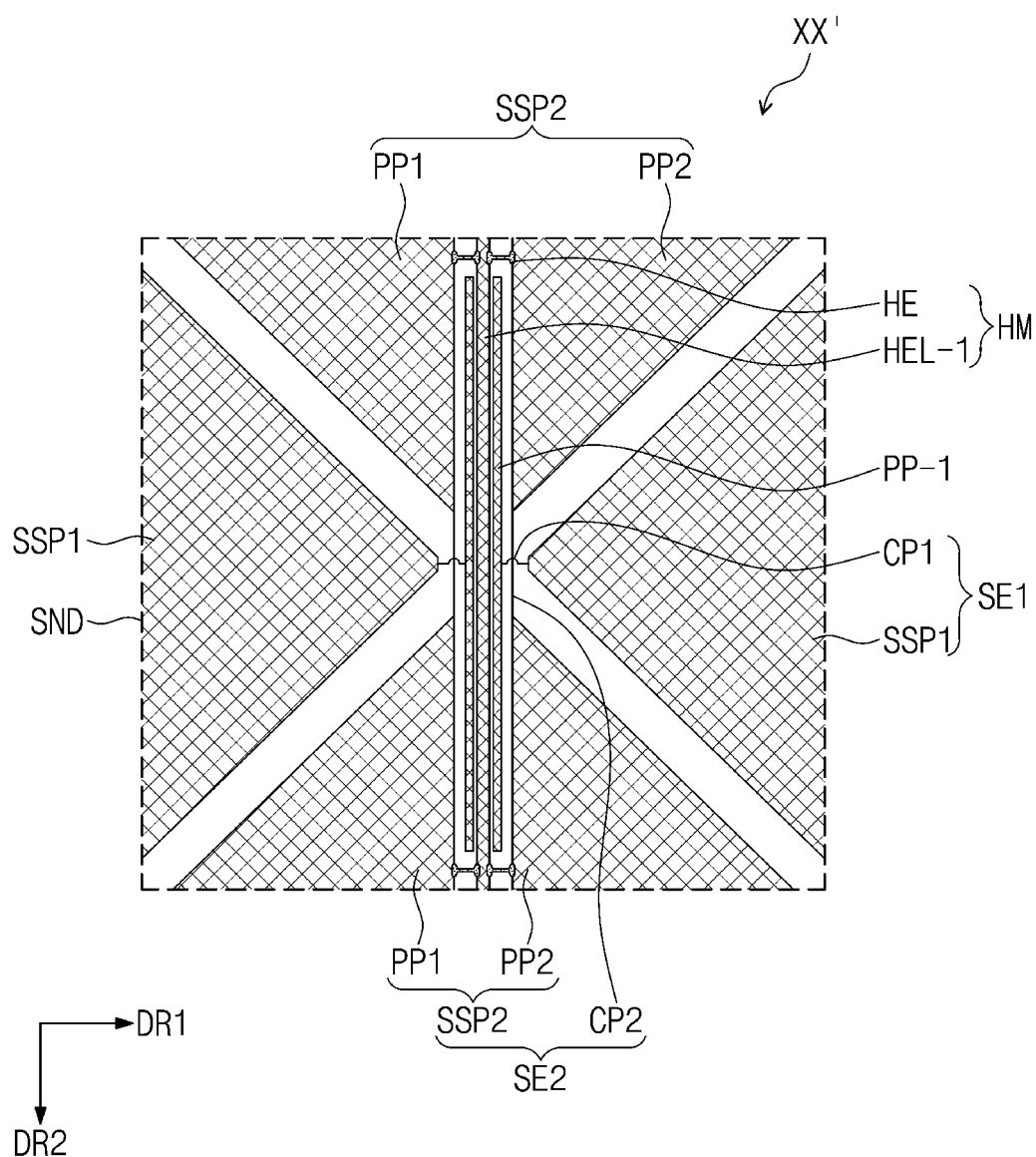

FIGS. 15A and 15B are enlarged views of a sensor unit SND according to an embodiment of the present disclosure. A temperature sensor TS is disposed in each of the sensor units SND.

In FIGS. 15A and 15B, in some embodiments, the temperature sensor TS disposed in each of the sensor units SND senses the temperature of the relevant sensor unit SND. For example, the sensing driver ICP receives information on the temperatures of sensor units SND from temperature sensors disposed in the sensor units SND, respectively, and selectively drives only those heat generating module HM of sensor units SND that should be heated.

Referring to FIG. 15A in an embodiment, the heat generating module HM is disposed in the second sensing electrode SE2. The temperature sensor TS is disposed in the first sensing electrode SE1, regardless of the heat generating module HM. The temperature sensor TS is disposed in the same layer as the heat generating electrode HEL.

The temperature sensor TS may extend in the first direction DR1 and may be disposed on the first sensing electrode SE1. The second sensing electrode SE2 includes the first part PP1 and the second part PP2 connected to each other through the heat generating electrode HEL and the heat generating device HE. The second sensing electrode SE2 may also include a third part PP3 disposed adjacent to the temperature sensor TS. The third part PP3 may be connected to the first part PP1 and the second part PP2 through the second connection part CP2. In an embodiment, a plurality of second connection part CP2 are provided.

Third parts PP3 may be disposed on opposite sides of the temperature sensor TS and surround the temperature sensor TS. The temperature sensor TS may measure the temperature of each of the sensor electrodes SND through the third part PP3. A plurality of the heat generating electrodes HEL are provided that are spaced apart from each other, and the temperature sensor TS is interposed between the heat generating electrodes HEL. The heat generating electrode HEL includes a connection part HCP that connects a plurality of portions. The heat generating electrode HEL may be disposed in the same layer as the temperature sensor TS. The connection part HCP of the heat generating electrode HEL may be disposed in a different layer from the other portions of the heat generating electrode HEL.

Referring to FIG. 15B, in an embodiment, the temperature sensor is integrated into the heat generating module HM disposed on the second sensing electrode SE2. The temperature sensor is integrated into a heat generating electrode HEL-1. For example, the heat generating electrode HEL-1 of FIG. 15B functions as the temperature sensor. According to an embodiment, a voltage is applied to the heat generating electrode HEL-1 such that the heat generating electrode HEL-1 functions as the temperature sensor. To simultaneously operate the heat generating electrode HEL-1 as the temperature sensor when the heat generating module HM is operated, a voltage −Vtx (see FIG. 13), which has a reverse phase to a phase of the driving voltage Vtx (see FIG. 13) applied to the second sensing electrode, is applied to the heat generating electrode HEL-1.

The first sensing electrode SE1 includes a first part and a second part PP-1. The first part is the sensor part SSP1. The second part PP-1 is adjacent to the temperature sensor HEL-1. The second part PP-1 and the sensor part SSP1 are connected through the first connection part CP1.

Figure 16:
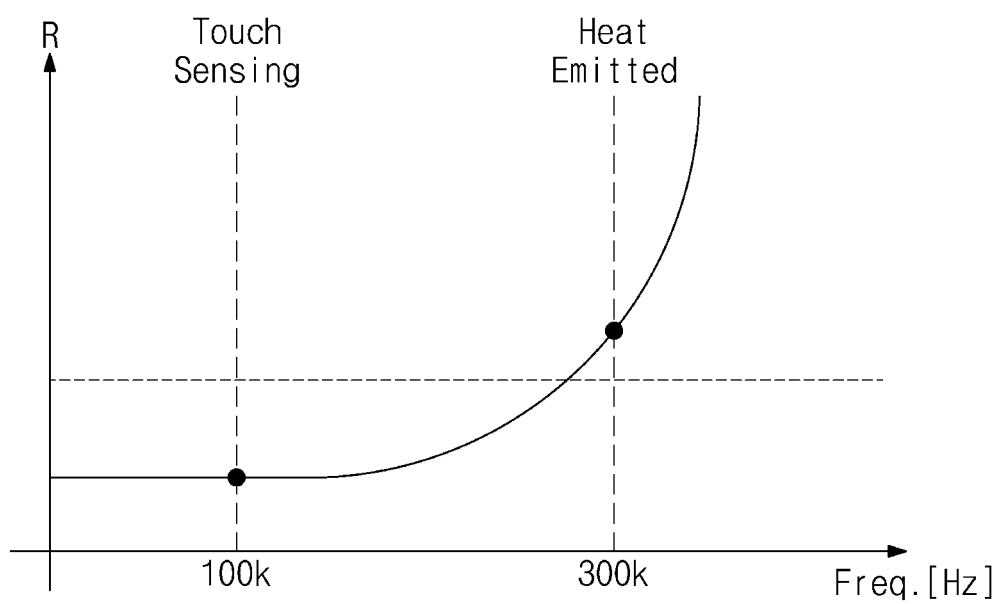
FIG. 16 is a graph of resistance as a function of frequency, according to an embodiment of the present disclosure.

FIG. 16 is a graph of resistance as a function of frequency, according to an embodiment of the present disclosure. In general, as a frequency is increased, a resistance increases. The sensing driver ICP (see FIG. 6) adjusts a driving frequency of the second sensing electrode SE2 (see FIG. 6). The heat generating module HM (see FIG. 7) is driven based on a driving voltage applied to the second sensing electrode SE2. For example, the heat generating module HM is controlled based on a driving frequency applied to the second sensing electrode SE2.

The sensing driver ICP increases the driving frequency when the heat generating module HM is necessary needs to generate heat, such as when a low temperature is sensed through the temperature sensor). For example, the resistance of the heat generating device HE (see FIG. 7) is increased by high-frequency driving. When an external input is sensed at times when heat-generation is not necessary, the resistance of the heat generating device HE is reduced by low-frequency driving. When the resistance of the heat generating device HE is reduced, heat is not emitted.

FIG. 16 illustrates a frequency range for controlling the heat generating module HM according to an embodiment of the present disclosure. In FIG. 16, when the heat generating module HM does not generate heat, and the input sensor ISP (see FIG. 6) senses an external input, the driving frequency is 100 kHz. When the heat generating module HM generates heat, the driving frequency is 300 kHz.

For example, the heat generating module HM is turned on/off depending on the magnitude of a driving frequency applied to the input sensor ISP.

According to an embodiment of the present disclosure, an electronic device includes a heat generating module disposed in an input sensor that increases the folding reliability at a lower temperature.

As described above, embodiments are disclosed in drawings and specifications. Therefore, it will be understood that various modifications and other equivalent embodiments are possible by those skilled in the art.

While embodiments of the present disclosure have been described with reference to the drawings, it will be apparent to those of ordinary skill in the art that various changes and modifications may be made thereto without departing from the spirit and scope of embodiments of the present disclosure as set forth in the following claims.

What is claimed is:

1. An electronic device, comprising:
    a display panel that includes a light emitting region, a non-light emitting region, and a light emitting device disposed in the light emitting region;
    an input sensor disposed on the display panel and that includes a first sensing electrode that extends in a first direction and a second sensing electrode that extends in a second direction that crosses the first direction; and
    a heat generating module disposed on the input sensor, wherein the heat generating module includes:
    a heat generating electrode disposed in a same layer as the first sensing electrode and the second sensing electrode; and
    a heat generating device disposed on the heat generating electrode and the second sensing electrode that electrically connects the heat generating electrode to the second sensing electrode.

2. The electronic device of claim 1, wherein the heat generating device includes:
    a conductor that generates heat in proportion to a resistance.

3. The electronic device of claim 1, further comprising:
    a sensor driver connected to the input sensor,
    wherein the first sensing electrode is a receive electrode that transmits a sensing voltage to the sensor driver, and
    wherein the second sensing electrode is a transmit electrode that receives a driving voltage from the sensor driver.

4. The electronic device of claim 3, wherein the heat generating module is driven based on the driving voltage, wherein the heat generating device emits heat.

5. The electronic device of claim 1, wherein the first sensing electrode, the second sensing electrode, and the heat generating electrode have a mesh shape that includes a mesh pattern that overlaps the non-light emitting region.

6. The electronic device of claim 5, wherein the heat generating device includes a plurality of heat generating devices, and the plurality of heat generating devices overlap the mesh pattern.

7. The electronic device of claim 6, further comprising:
    a light blocking pattern disposed on the mesh pattern and that overlaps the non-light emitting region,
    wherein the light blocking pattern covers the plurality of heat generating devices.

8. The electronic device of claim 1, wherein the second sensing electrode includes:
    a first part and a second part that are spaced apart from each other,
    wherein the heat generating electrode is interposed between the first part and the second part.

9. The electronic device of claim 8, wherein the heat generating device includes:
    a first heat generating device that connects the first part to the heat generating electrode; and
    a second heat generating device that at connects the second part with the heat generating electrode.

10. The electronic device of claim 1, wherein the heat generating module further includes:
    a switch connected to the heat generating electrode,
    wherein the switch controls a driving of the heat generating device.

11. The electronic device of claim 1, further comprising:
    a thin film encapsulating layer disposed on the display panel,
    wherein the input sensor is directly disposed on the thin film encapsulating layer.

12. The electronic device of claim 11, wherein the input sensor includes:
    a first insulating layer disposed on the thin film encapsulating layer; and
    a second insulating layer disposed on the first insulating layer,
    wherein the first sensing electrode, the second sensing electrode, and the heat generating electrode are disposed on the first insulating layer.

13. The electronic device of claim 12, wherein the heat generating device is disposed on the second insulating layer,
    wherein the second insulating layer has an opening that exposes the second sensing electrode and the heat generating electrode, and
    wherein the heat generating device is electrically connected to the second sensing electrode and the heat generating electrode through the opening.

14. The electronic device of claim 13, wherein the heat generating device includes:
    a light blocking material that blocks light from being transmitted or reflected.

15. The electronic device of claim 1,
    wherein a first voltage is applied to the second sensing electrode, and wherein a second voltage that is phase reversed with respect to a phase of the first voltage is applied to the heat generating electrode.

16. The electronic device of claim 15, wherein the heat generating electrode includes:
a temperature sensor,
wherein the first sensing electrode includes:
a first part adjacent to the temperature sensor; and
a second part connected to the first part and that is not adjacent to the temperature sensor.

17. The electronic device of claim 1, further comprising:
a temperature sensor disposed in the same layer as the input sensor,
wherein the input sensor includes:
a plurality of sensor units,
wherein each sensor unit includes the first sensing electrode and the second sensing electrode,
wherein the temperature sensor measures a temperature of each of the plurality of sensor units.

18. The electronic device of claim 17, wherein the temperature sensor extends in the first direction, and
wherein each of a plurality of second sensing electrodes includes:
a first part adjacent to the temperature sensor; and
a second part connected to the first part and that is not adjacent to the temperature sensor.

19. The electronic device of claim 18, wherein the heat generating device includes a plurality of heat generating devices,
wherein the plurality of heat generating devices are provided in the plurality of sensor units, respectively, and
wherein the plurality of heat generating devices connect the heat generating electrode to the second part.

20. The electronic device of claim 19,
wherein the temperature sensor senses a temperature of each sensor unit through the first part of the second sensing electrodes, and
wherein the heat generating module selectively drives heat generating devices disposed in some sensor units of the plurality of sensor units based on the temperature of each sensor unit.

21. The electronic device of claim 4, wherein the heat generating module controls a heat emitting operation of the heat generating device based on a driving frequency applied to the input sensor.

22. An electronic device, comprising:
an input sensor that includes a plurality of sensor units, wherein each sensor unit includes a plurality of first sensing electrodes that extend in a first direction and a plurality of second sensing electrodes that extend in a second direction that crosses the first direction;
a heat generating module disposed on the input sensor; and
a temperature sensor disposed in a same layer as the input sensor, wherein the temperature sensor measures a temperature of each of the plurality of sensor units,
wherein the heat generating module includes:
a heat generating electrode disposed in a same layer as the first sensing electrodes and the second sensing electrodes; and
a plurality of heat generating devices disposed on the heat generating electrode and the second sensing electrodes that electrically connect the heat generating electrode to the second sensing electrodes,
wherein the heat generating module selectively drives heat generating devices disposed in some sensor units of the plurality of sensor units based on the temperature of each sensor unit.

23. The electronic device of claim 22, further comprising;
a display panel that includes a light emitting region, a non-light emitting region, and a light emitting device disposed in the light emitting region, wherein the input sensor is disposed on the display panel.

* * * * *